United States Patent
Spillane et al.

(10) Patent No.: US 10,853,438 B1
(45) Date of Patent: Dec. 1, 2020

(54) HISTORY STATE MANAGEMENT

(71) Applicant: Workday, Inc., Pleasanton, CA (US)

(72) Inventors: Hob Anthony Spillane, Williams Township, PA (US); Joseph Bennett, Oakland, CA (US)

(73) Assignee: Workday, Inc., Pleasanton, CA (US)

( * ) Notice: Subject to any disclaimer, the term of this patent is extended or adjusted under 35 U.S.C. 154(b) by 396 days.

(21) Appl. No.: 15/085,883

(22) Filed: Mar. 30, 2016

Related U.S. Application Data

(60) Provisional application No. 62/259,554, filed on Nov. 24, 2015.

(51) Int. Cl.
*G06F 3/00* (2006.01)
*G06F 16/957* (2019.01)
*G06F 3/0484* (2013.01)

(52) U.S. Cl.
CPC ........ *G06F 16/957* (2019.01); *G06F 3/04842* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,594,477 B1 * | 3/2017 | Ardakani | ............... | G06F 16/957 |
| 2004/0243928 A1 * | 12/2004 | Hesmer | ............... | G06F 17/3089 |
| | | | | 715/223 |
| 2006/0224978 A1 * | 10/2006 | Albrecht | ................ | G06F 9/451 |
| | | | | 715/760 |
| 2007/0073902 A1 * | 3/2007 | Miyahara | ................ | G06F 9/542 |
| | | | | 709/246 |
| 2008/0021977 A1 * | 1/2008 | Jones | .................... | G06F 17/241 |
| | | | | 709/217 |
| 2008/0295003 A1 * | 11/2008 | Behl | ................ | G06F 17/30873 |
| | | | | 715/760 |
| 2009/0228805 A1 * | 9/2009 | Ruehle | ................. | G06F 9/4493 |
| | | | | 715/745 |
| 2009/0287658 A1 * | 11/2009 | Bennett | ................. | G06F 16/951 |
| 2011/0307607 A1 * | 12/2011 | Le Roy | ................ | G06F 9/4443 |
| | | | | 709/224 |
| 2012/0136764 A1 * | 5/2012 | Miller | ................. | G06Q 40/123 |
| | | | | 705/31 |
| 2014/0250366 A1 * | 9/2014 | Bertram | ............. | G06F 17/2705 |
| | | | | 715/234 |
| 2014/0337376 A1 * | 11/2014 | Wilson | ............. | G06F 17/30899 |
| | | | | 707/769 |
| 2014/0380194 A1 * | 12/2014 | Kim | .................... | G06F 3/04842 |
| | | | | 715/753 |
| 2015/0169152 A1 * | 6/2015 | Shearer | ................. | G06F 3/0484 |
| | | | | 715/760 |
| 2016/0004676 A1 * | 1/2016 | Goto | ................... | G06F 16/9566 |
| | | | | 715/234 |
| 2017/0212965 A1 * | 7/2017 | Gnech | .................. | G06F 3/0483 |

* cited by examiner

*Primary Examiner* — Anil N Kumar

(74) *Attorney, Agent, or Firm* — Van Pelt, Yi & James LLP

(57) ABSTRACT

A system for saving the state history of a web browser includes an interface and a processor. The interface is to receive an instruction to begin. The processor is to provide a display window code. The display window code causes retention of a display window state history. The display window state history comprises a display window state for each display window in a set of one or more display windows previously or currently displayed. The display window state comprises a composite state for a set of the one or more window modules.

23 Claims, 23 Drawing Sheets

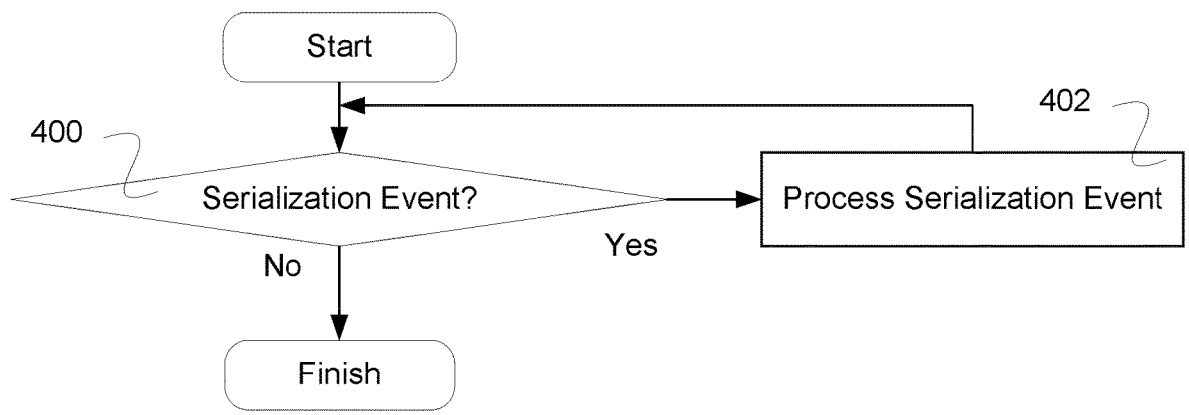
FIG. 4A1
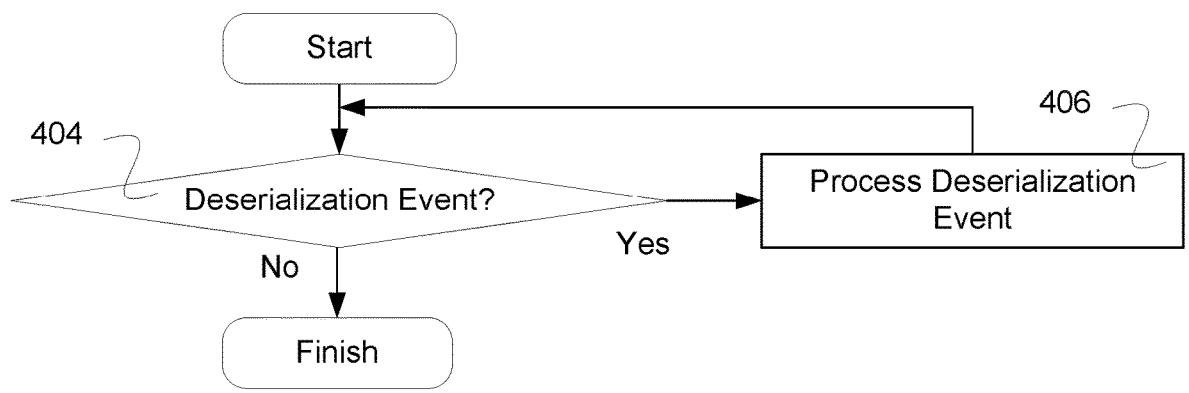
FIG. 4A2

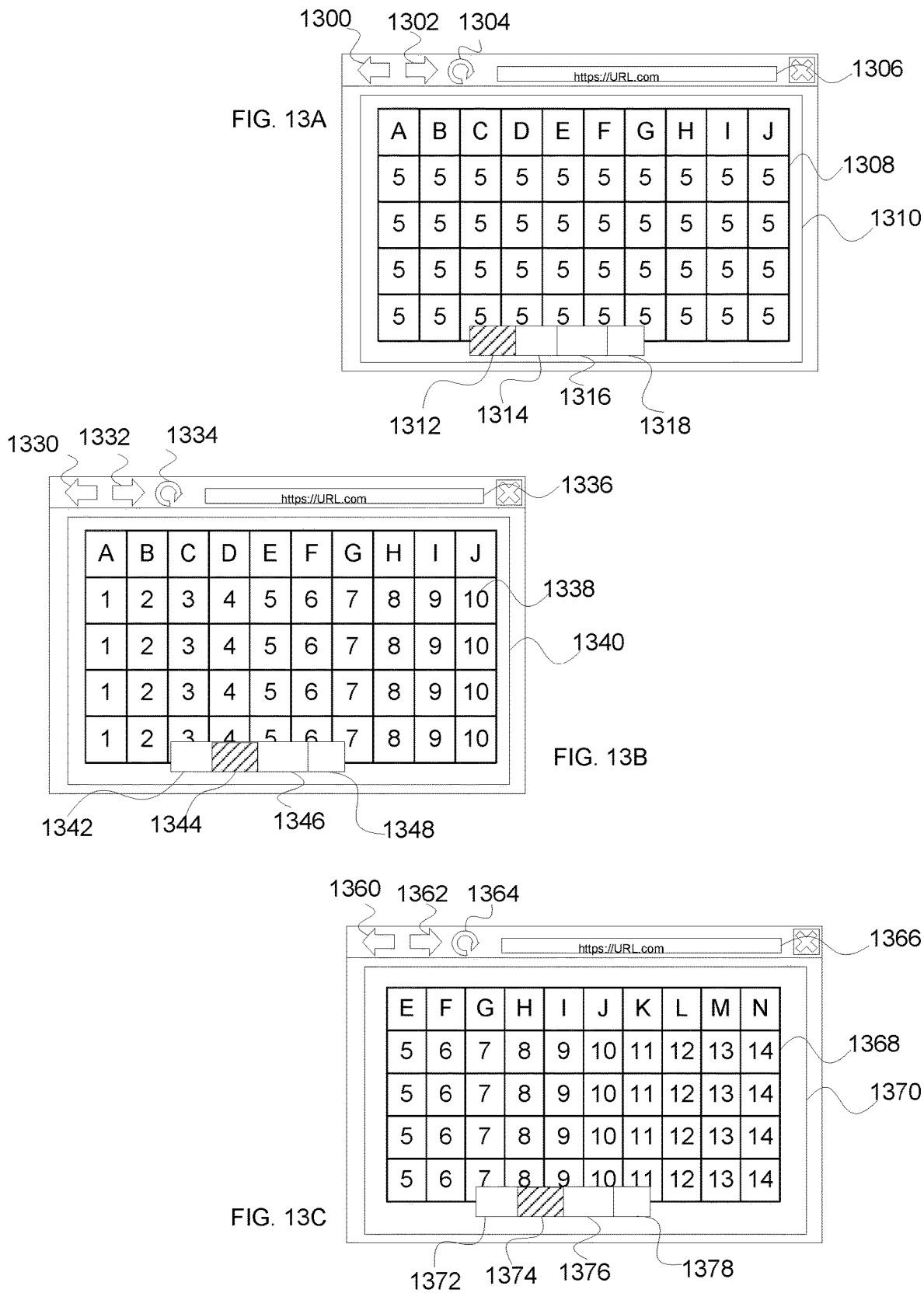

HISTORY STATE MANAGEMENT

CROSS REFERENCE TO OTHER APPLICATIONS

This application claims priority to U.S. Provisional Patent Application No. 62/259,554 entitled HISTORY STATE MANAGEMENT filed Nov. 24, 2015 which is incorporated herein by reference for all purposes.

BACKGROUND OF THE INVENTION

When using a generic web browser, a user is able to navigate to webpages within the browser history. As webpages become more intricate, users often find themselves directed to a state of the webpage that is undesired or unintuitive. A webpage may comprise multiple modules, some of which may be nested. Current systems make it difficult to consistently return to a desired webpage state, inclusive of module state.

BRIEF DESCRIPTION OF THE DRAWINGS

Various embodiments of the invention are disclosed in the following detailed description and the accompanying drawings.

FIG. 4A1 is a flow diagram illustrating an embodiment of a process for state history management.

FIG. 4A2 is a flow diagram illustrating an embodiment of a process for state history management.

FIG. 13A is a diagram illustrating an embodiment of history management system applied to a worksheet module.

FIG. 13B is a diagram illustrating an embodiment of history management system applied to a worksheet module.

FIG. 13C is a diagram illustrating an embodiment of history management system applied to a worksheet module.

DETAILED DESCRIPTION

Figure 1:
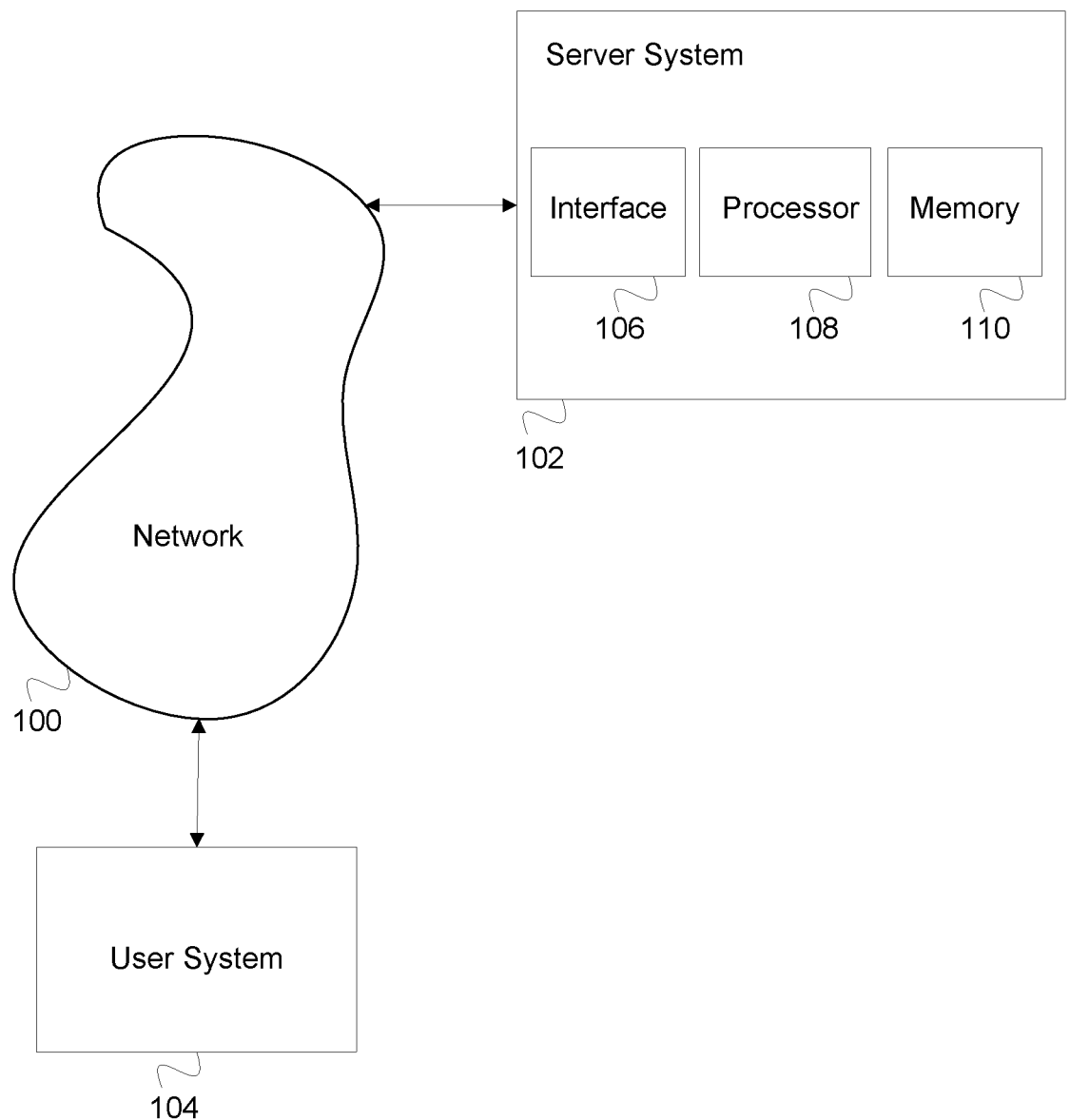
FIG. 1 is a block diagram illustrating an embodiment of a browser history management system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not A system for saving the state history of a web browser is disclosed. The system comprises a processor to provide a display window code, wherein the display window code causes retention of a display window state history. The display window state history comprises a display window state for each display window in a set of one or more display windows previously or currently displayed. The display window code causes displaying one or more window modules. The display window code causes determination of a state for each window module in a set of the one or more window modules. The display window state comprises a composite state for the set of the one or more window modules based at least in part on the state(s) of the window module(s) in the set of the one or more window modules.

In some embodiments, the system saves the state of a display window (e.g., webpage) to a display window state history. In some embodiments, the display window state history (e.g., browser history), is stored in the browser memory. In some embodiments, every webpage the user has navigated to since the web browser application was opened has its state stored in the browser history. In some embodiments, a webpage comprises one or more modules. In some embodiments, a module comprises a building block for a UI display or page. In various embodiments, a module is nested in another module, or a module is not nested in another module, or a module and another module have any other appropriate relation. In some embodiments, a module comprises a detail container that contains text, images, video, or any other appropriate content. In some embodiments, a module comprises a list container that contains list items. In some embodiments, a module comprises a list item that has an associated content that is displayed in a detail container. In some embodiments, a module comprises a web application. In some embodiments, a display page state contains information on the states of a set of the modules present on the display page.

In some embodiments, a window module state is stored in the uniform record locator (e.g., URL). A user is able to return to the webpage with the stored state of the window module by entering the URL into the web browser. In some embodiments, the URL also contains state information not related to the window module—for example, the states of other window modules.

In some embodiments, a window module state is stored in a non-URL format. In some embodiments, a window module state is stored as a javascript object notation (JSON) object. In some embodiments, storing the state in memory in a non-URL format allows the history management system to use that state to respond to a user navigation indication (e.g., using the back, forward, and refresh arrows) but not on the occasion that the user is simply returning to a bookmarked URL. In some embodiments, the non-URL object in the browser memory also contains state information not related to the window module—for example, the states of other window modules.

In some embodiments, a display page state is stored in a URL. A user is able to return to that exact state by entering the URL into the web browser. In some embodiments, a URL indicates which modules are displayed on the webpage.

In some embodiments, the display page state is stored in both a URL and in a non-URL form. For example, a display page may store some of its state in a URL, so that it becomes part of a user's bookmark, and some in JSON code so that it is, explicitly, not part of a bookmark. When restoring state as a result of the user navigating the browser history, the state is aggregated from both the URL and the non-URL format. When restoring state as a result of clicking a bookmark, the state is taken from the URL alone.

In some embodiments, the display window code allows for the state of a window module to be independent of another window module. For example, a first window module may have a second module nested within it while the first module itself is nested within a third module. In some embodiments, the first window module state does not contain information about the second module nested within it and does not contain information about the first module's location within the third module. In some embodiments, the second window module state does not include state information associated with the first window module that is outside of the second window module. In some embodiments, all window modules are independent by default unless explicitly defined by the developer (e.g., module independence is one of the features of history state management). In some embodiments, the history state management system is designed to make complex, independent window modules work together in an easy manner.

In some embodiments, the display window code allows for more specific, accurate browser history than a traditional browser history wherein webpage navigation is based solely on URL. In some embodiments, the display window code allows for fine tuning of where the back, forward, and refresh buttons navigate to due to the inclusion of states stored in a non-URL format. In some cases, a developer does not wish to store a module state in a URL. For example, a developer chooses to store the states of an inbox module in a non-URL format such that a user that bookmarks the inbox in any state can use that bookmark to return to the default state of the inbox. At the same time, the inbox module states are used in back and forward arrow navigations. The system for state management allows module states to guide webpage navigation without being visible in the URL. In various embodiments, a window module state is used to describe a location on the webpage, content to be displayed, size of the window module, and/or any other appropriate state.

In some embodiments, a composite state does not include the state(s) of one or more window modules displayed. In some embodiments, a window module displayed has one possible state. In some embodiments, a window module state is not included in the display page state because the presence of the module implies that it is displayed in its only state. In some embodiments, the display page state comprises a URL that indicates the presence of the module. In some embodiments, a module that has multiple possible states has a default state. In some embodiments, a module that has multiple possible states is displayed in its default state in the event that the module is indicated to be displayed, but a state is not specified in the display page state. In some embodiments, a module that has multiple possible states does not have its state information included in the display page state. In some embodiments, a module that has multiple possible states has its state suppressed by another module. For example, a user may browse a webpage with a first module in an initial module state, cause a change to the state of the module, navigate to a new webpage by entering a new URL, and navigate back to the previous webpage. In the case that the first module's state is not part of the composite state committed to browser history, due to having its state suppressed by another module, in some embodiments, the user will be returned to the previous webpage with the first module in its initial state rather than the subsequent module state that had been navigated to by the user. In some embodiments, the display window code gives the developer flexibility to guide the user's navigation by selecting which modules have state committed to the browser history.

FIG. 1 is a block diagram illustrating an embodiment of a browser history management system. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. Server system 102 and user system 104 communicate via network 100. In various embodiments, server system 102 comprises a server for providing a display window code, an applications server, a web server, a user interface server, a human resources system software server, or any other appropriate server. User system 104 comprises a system for a user. In some embodiments, user system 104 comprises a web browser to navigate to and between webpages (e.g., display pages). In some embodiments, user system 104 comprises a display window code. Server system 102 comprises interface 106, processor 108, and memory 110. In some embodiments, interface 106 comprises an interface configured to receive an indication of a request to display a webpage based on a description. In various embodiments, the description comprises a URL, a non-URL state, or a combination of URL with a non-URL state. In some embodiments, processor 108 comprises a processor configured to provide a display window code. In some embodiments, processor 108 comprises a processor configured to identify and retrieve requested information from memory 110. In some embodiments, memory 110 comprises a memory coupled to processor 108 and configured to provide processor 108 with instructions.

Figure 2A:
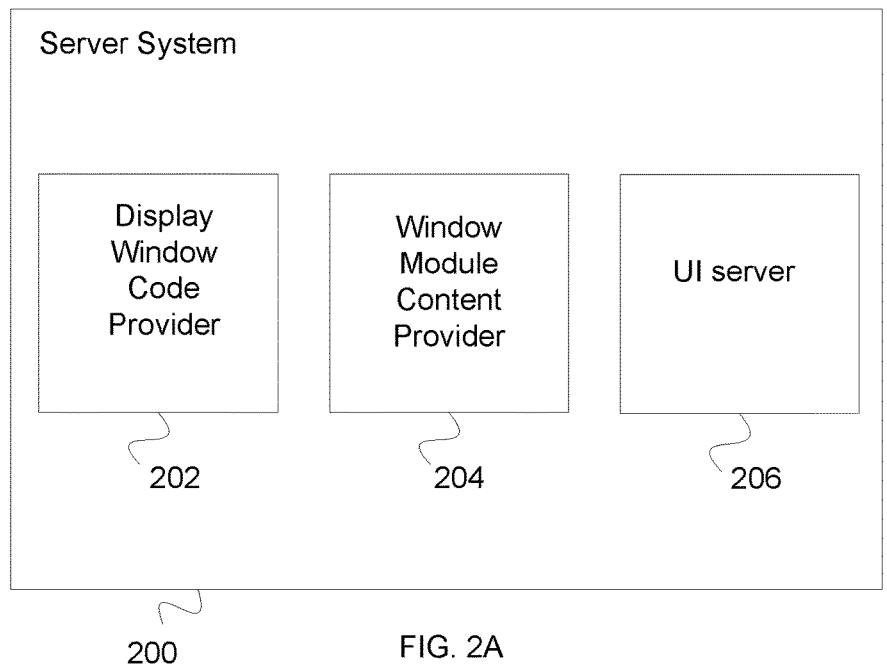
FIG. 2A is a block diagram illustrating an embodiment of a server system of a browser history management system.

FIG. 2A is a block diagram illustrating an embodiment of a server system. In some embodiments, server system 200 comprises a server cluster. In some embodiments, server system 200 implements server system 102 of FIG. 1. In the example shown, server system 200 comprises display window code provider 202 which provides a display window code. In some embodiments, the display window code is sent over a network to a user system (e.g., user system 104 of FIG. 1) as part of a software as a service system. In some embodiments, the display window code is sent over a network during a software update process. In some embodiments, the display window code is sent over upon receiving a user action, such as opening a web browser application. In some embodiments, server system 200 comprises window module content provider 204. In various embodiments, window module content provider 204 comprises module information for one, two, fifty, or any appropriate number of modules. In some embodiments, a user system loads the complete module information for a module of a webpage from server system 200 via a network when a user accesses the webpage. In some embodiments, the complete module information is not replicated on a user system and further user interaction with the module causes requests to window module content provider 204. In some embodiments, server system 200 comprises UI server 206. In some embodiments, display window code provider 202 and window module content provider 204 comprise a transaction server that communicates with UI server 206. In some embodiments, UI server 206 communicates with a user system over a network.

Figure 2B:
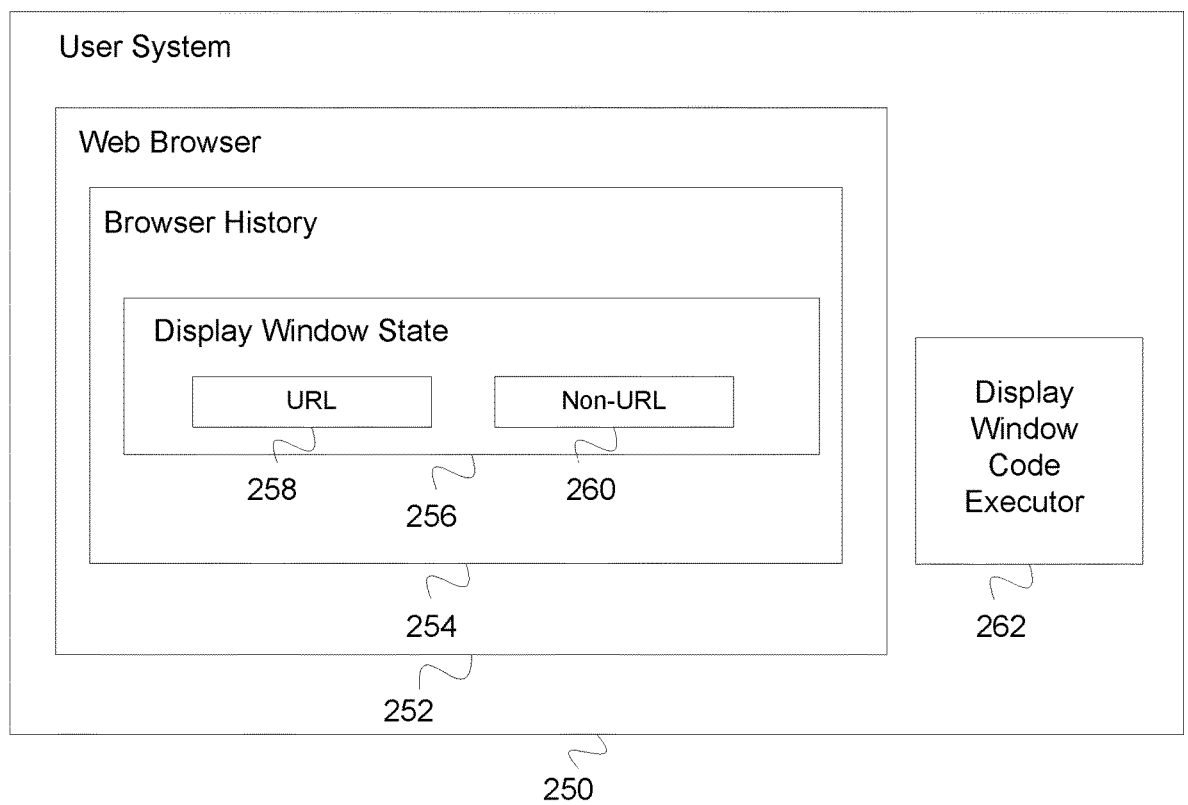
FIG. 2B is a block diagram illustrating an embodiment of a user system of a browser history management system.

FIG. 2B is a block diagram illustrating an embodiment of a user system. In some embodiments, user system 250 implements user system 104 of FIG. 1. In the example shown, user system 250 comprises display window code executor 262 which is provided by a display window code provider. For example, display window code provider provides code to user system 250 to generate display window code executor 262. In some embodiments, display window code executor 262 causes displaying the one or more window modules of a display page by sending instruction to a server system via a network and prompting the server system to send the display information needed to display the webpage. In some embodiments, the display information comprises Javascript®, cascading style sheets (CSS), hypertext markup language (HTML), or any other appropriate information. In some embodiments, the display information for a module is determined by a window module content provider. In some embodiments, a change in webpage causes display window code executor 262 to request a UI server to provide a hierarchy of the module(s) displayed.

In some embodiments, user system 250 comprises web browser 252. In some embodiments, a user uses web browser 252 to navigate to and between webpages. In some embodiments, the web browser interface includes a back arrow, a forward arrow, a refresh arrow, and a URL box. In some embodiments, user navigation of the web browser triggers the display window code to store a display window state. In some embodiments, web browser 252 comprises web browser history 254. In some embodiments, web browser history 254 is stored in the browser memory. In some embodiments, the display window code commits or stores display window state 256 to the browser state history. In some embodiments, display window state 256 comprises URL component 258 and non-URL component 260. In some embodiments, URL component 258 indicates a module that is displayed in the display page state. In some embodiments, non-URL component 260 indicates the state of a module displayed.

Figure 3A:
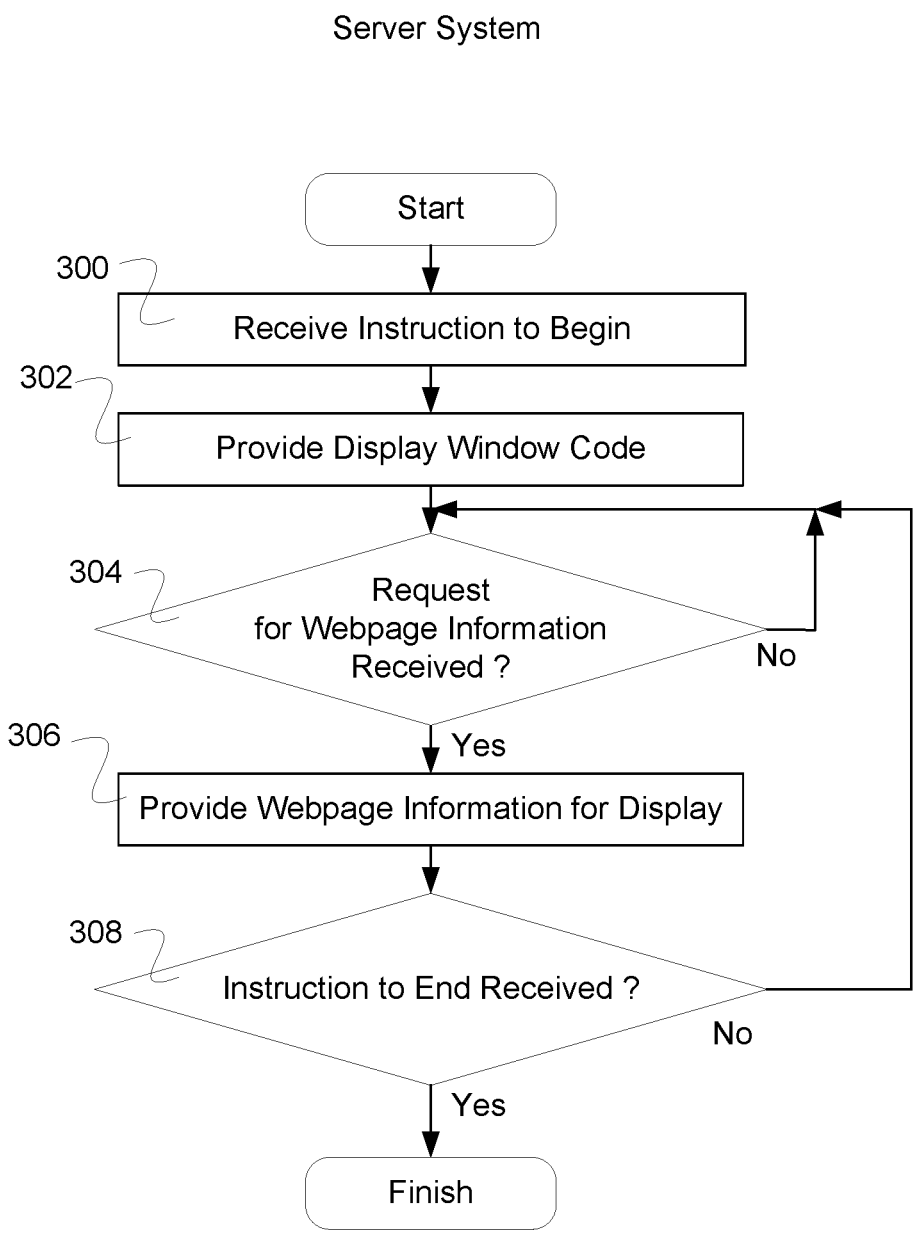
FIG. 3A is an embodiment of a flow diagram of a process for history management from the perspective of the server system.

FIG. 3A is an embodiment of a flow diagram for history management from the perspective of the server system. In the example shown, in 300, the server receives instruction to begin. In various embodiments, the instruction to begin comprises an automatic software update, a user selection of a download, opening of a web browser application, or any other appropriate instruction. In 302, the server provides the display window code over a network to a user system (e.g., user system 104 of FIG. 1). For example, the server provides information to the user system including code for interacting with the server system and, in particular, code (e.g., display window code) for displaying server information on the user system. In addition, the display window code causes retention of a display window state history, wherein the display window state history comprises a display window state for each display window in a set of one or more display windows previously or currently displayed, wherein the display window code causes displaying one or more window modules, wherein the display window code causes determination of a state for each window module in a set of the one or more widow modules, and wherein the display window state comprises a composite state for the set of the one or more window modules based at least in part on the state(s) of the window module(s) in the set of the one or more window modules. In some embodiments, 300 and 302 are performed only once (e.g., as part of an initial flow). In some embodiments, 300 and 302 are performed each time a user performs an action, such as opening a web browser application. In 304, it is determined whether a request for webpage information has been received by the server. In some embodiments, the request is sent over a network from a user system. In the event that a request for webpage information has not been received, then control passes to 304. In the event that a request for webpage information has been received, then in 306, the server system provides webpage information associated with the requested webpage. In some embodiments, the webpage information is provided for display. In various embodiments, the provided webpage information comprises Javascript, CSS, HTML, or any other appropriate information. In various embodiments, the webpage is requested based on a URL, non-URL, or combination state. In 308, it is determined whether an instruction to end has been received. In the event that an instruction to end has not been received, then control passes to 304. In the event that an instruction to end has been received, then the process ends. In some embodiments, the instruction to end comprises a user action of exiting a web browser application. In some embodiments, the instruction to end deletes a display code executor on the user system.

Figure 3B:
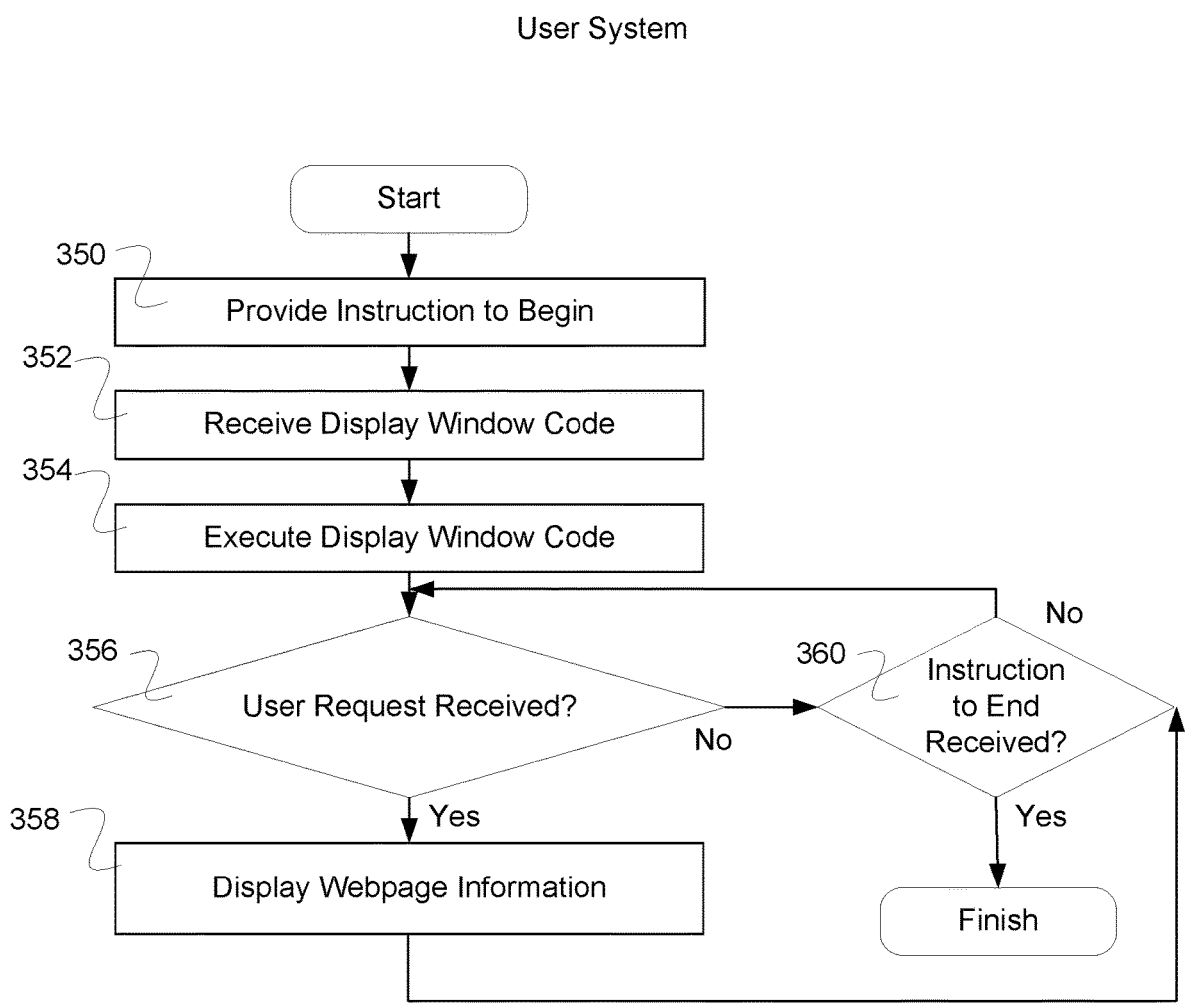
FIG. 3B is an embodiment of a flow diagram for history management from the perspective of the user system.

FIG. 3B is an embodiment of a flow diagram for history management from the perspective of the user system. In some embodiments, the flow of FIG. 3B is executed using display window code executor 262 of FIG. 2B. In the example shown, in 350 an instruction is provided to begin. For example, a user indicates to begin interaction with the server system. In 352, display window code is received. For example, code is received to interact with the server system that enables display of the information received from the server system and to enable history management. In 354, display window code is executed. In 356, it is determined whether a user request is received. In the event that a user request is not received, then in 360 it is determined whether an instruction to end has been received. In the event that an instruction to end has been received, the process ends. In the event that an instruction to end has not been received, control passes to 356. In the event that a user request has been received in 356, then in 358 webpage information is displayed, and control passes to 360.

FIG. 4A1 is a flow diagram illustrating an embodiment of a process for state history management. In some embodiments, the process of FIG. 4A1 is executed using a window code executor (e.g., display window code executor 262 of FIG. 2B). In the example shown, in 400 it is determined whether a serialization event has occurred. In the event that a serialization event has occurred, in 402 the serialization event is processed and control passes to 400. For example, an action or event caused by the user (e.g., interactions by a user with modules on the screen—links, buttons, etc.) that causes the system to update the stored state for the display (e.g., a stored composite state in a URL and/or a non-URL format). In the event that a serialization event has not occurred, the process ends.

FIG. 4A2 is a flow diagram illustrating an embodiment of a process for state history management. In some embodiments, the process of FIG. 4A2 is executed using a window code executor (e.g., display window code executor 262 of FIG. 2B). In the example shown, in 404 it is determined whether a deserialization event has occurred. In the event that a deserialization event has occurred, then in 406 the deserialization event is processed and control passes to 404. For example, an action or event caused by the user causes the system to recall a stored state for the display (e.g., a stored composite state in a URL and/or a non-URL format).

In the event that a deserialization event has not occurred, then the process ends. In some embodiments, the process is repeated until the user finishes using the web service.

Figure 4B:
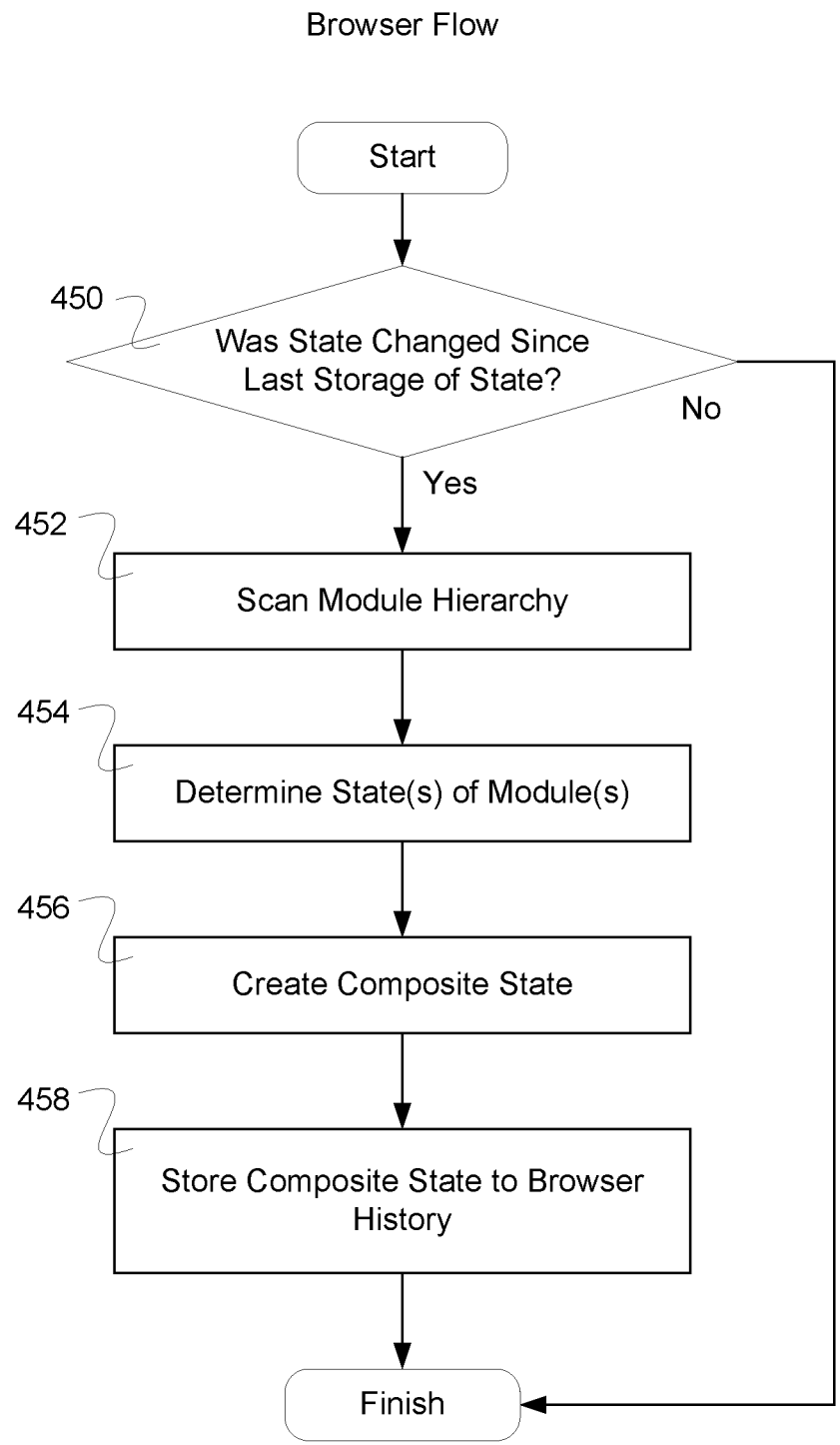
FIG. 4B is a flow diagram illustrating an embodiment of a process for processing a serialization event.

FIG. 4B is a flow diagram illustrating an embodiment of a process for processing a serialization event. In some embodiments, the process of FIG. 4B is used to implement 402 of FIG. 4A1. In the example shown, in 450 it is determined whether the state changed since the last storage of state. In the event that the state has not changed since the last storage of state, the process ends. In the event that the state has changed since the last storage of state, in 452 a module hierarchy is scanned. For example, the selection causes the display code to scan a module hierarchy. In some embodiments, the state(s) of the module(s) in the module hierarchy are stored in a non-URL form. In some embodiments, the module hierarchy is created via a UI server. In some embodiments, the display code creates a representation of that hierarchy and scans the representation. In some embodiments, the display code scans only modules that are designated to have state to contribute to the composite state. In some embodiments, one or more modules displayed on the webpage are not designated to have multiple possible states. In some embodiments, one or more modules displayed are designated to have multiple possible states but to not contribute state to the composite state. In 454, state(s) of module(s) is/are determined. For example, the display code determines the state of each module designated to contribute state to the composite state. In some embodiments, the state of each module is determined while the scanning of the module hierarchy occurs. In 456, a composite state is created. For example, the display code creates a composite state comprising the URL of the webpage and any module state(s) stored in a non-URL format. In 458, a composite state is stored to a browser history. For example, the display code stores the composite display page state to the browser history.

Figure 4C:
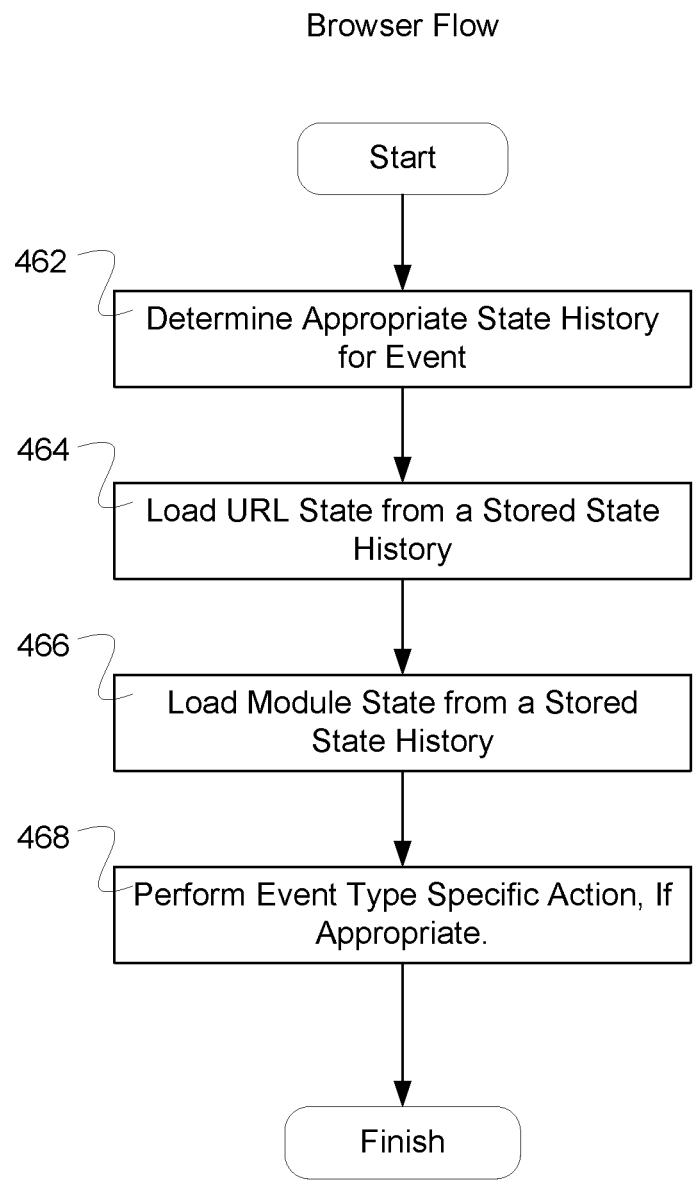
FIG. 4C is a flow diagram illustrating an embodiment of a process for processing a deserialization.

FIG. 4C is a flow diagram illustrating an embodiment of a process for processing a deserialization. In some embodiments, the process of FIG. 4C is used to implement 406 of FIG. 4A2. In the example shown, in 462 an appropriate state history for the event is determined. For example, in the event that a forward arrow is the event type, then the state history for the subsequent state in the browsing history is determined to be appropriate. As another example, in the event that a back arrow is the event type, then the state history for the previous state in the browsing history is determined to be appropriate. As yet another example, in the event that a refresh arrow is the event type, then the state history for the current state in the browsing history is determined to be appropriate. In 464, a URL state is loaded from a stored state history. For example, from a composite state history, uniform record locator (URL) is extracted and loaded into a browser. In 466, a module state is loaded from a stored state history. For example, from a composite state history, a module state is extracted and loaded into a browser. In 468, an event type specific action is performed, if appropriate. For example, in the event that a forward arrow is the event type, then a state history pointer is set to the subsequent state in the browsing history. As another example, in the event that a back arrow is the event type, then the state history pointer is set to the previous state in the browsing history. As yet another example, in the event that a refresh arrow is the event type, a state history pointer is set to or is left at the current state in the browsing history. In some embodiments, there is no event type specific action to be performed in 468.

Figure 4D:
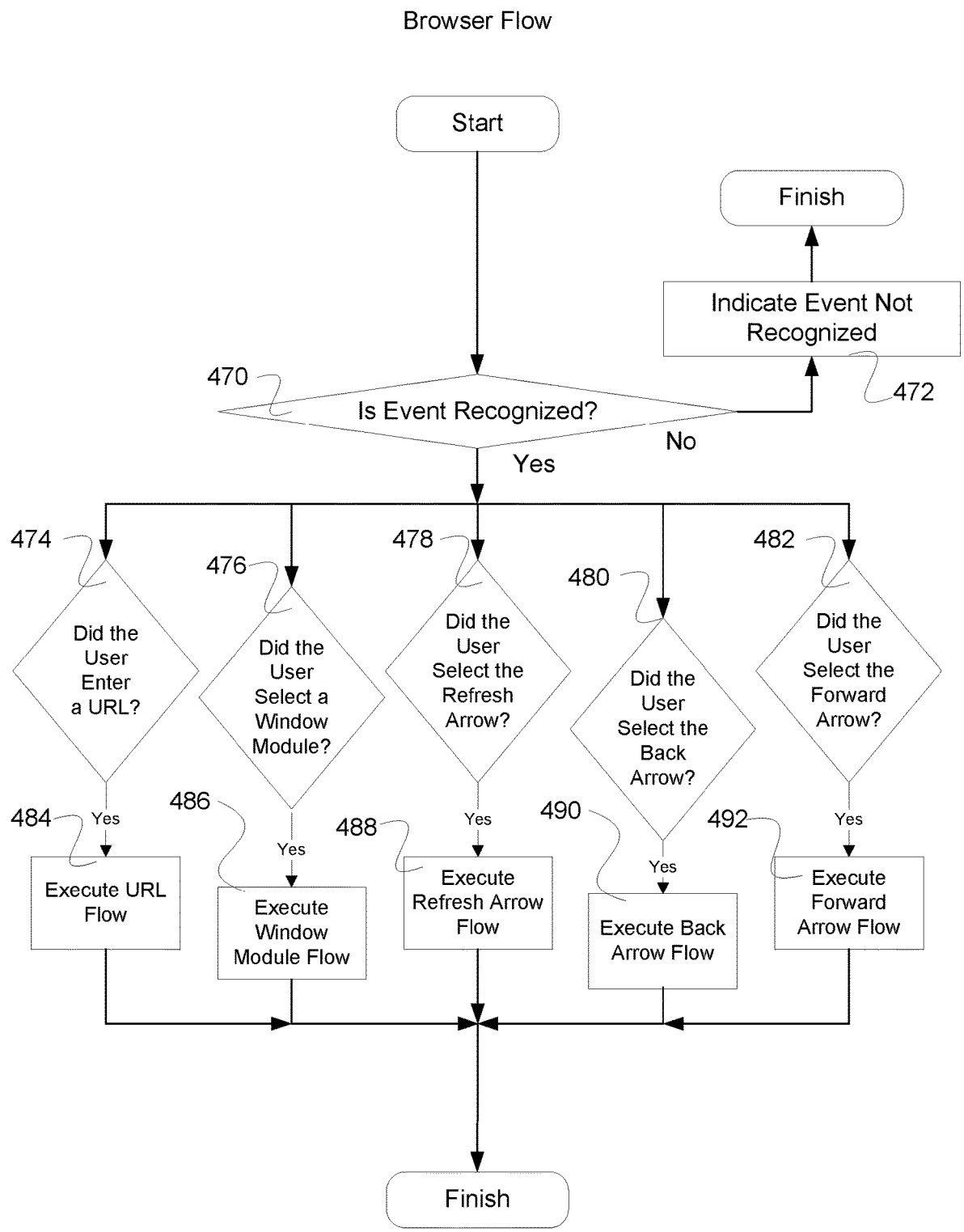
FIG. 4D is an embodiment of a flow diagram of a process for history management from the perspective of the web browser.

FIG. 4D is an embodiment of a flow diagram for history management from the perspective of the web browser. In some embodiments, the process of FIG. 4D is used to implement 406 of FIG. 4A2. In 470 it is determined whether the event is recognized. For example, a user navigation is performed on the browser interface (e.g., via a click or a selection on a touch screen), the browser receives the user navigation, and it is determined whether the navigation is recognized. In the event that the event is not recognized, then in 472 it is indicated that the event is not recognized and the process ends. In the event that the navigation is recognized, it is handled appropriately (e.g., in 474, 476, 478, 480, or 482). In 474, the display window code determines whether the user navigation was a user entering a URL. A user navigation of entering a URL triggers the display window code to execute a URL flow in 484. In 476, the display window code determines whether the user navigation was a user selecting a window module. A user navigation of selecting a window module triggers the display window code to execute a window module flow in 486. In 478, the display window code determines whether the user navigation was a user selecting a refresh arrow. A user navigation of selecting a refresh arrow triggers the display window code to execute a refresh arrow flow in 488. In 480, the display window code determines whether the user navigation was a user selecting a back arrow. A user navigation of selecting a back arrow triggers the display window code to execute a back arrow flow in 490. In 482, the display window code determines whether the user navigation was a user selecting a forward arrow. A user navigation of selecting a forward arrow triggers the display window code to execute a forward arrow flow in 492. In some embodiments, 472, 476, 478, 480, and 482 comprise all possible user navigations. In some embodiments, there are additional possible user navigations or events for the system.

Figure 5:
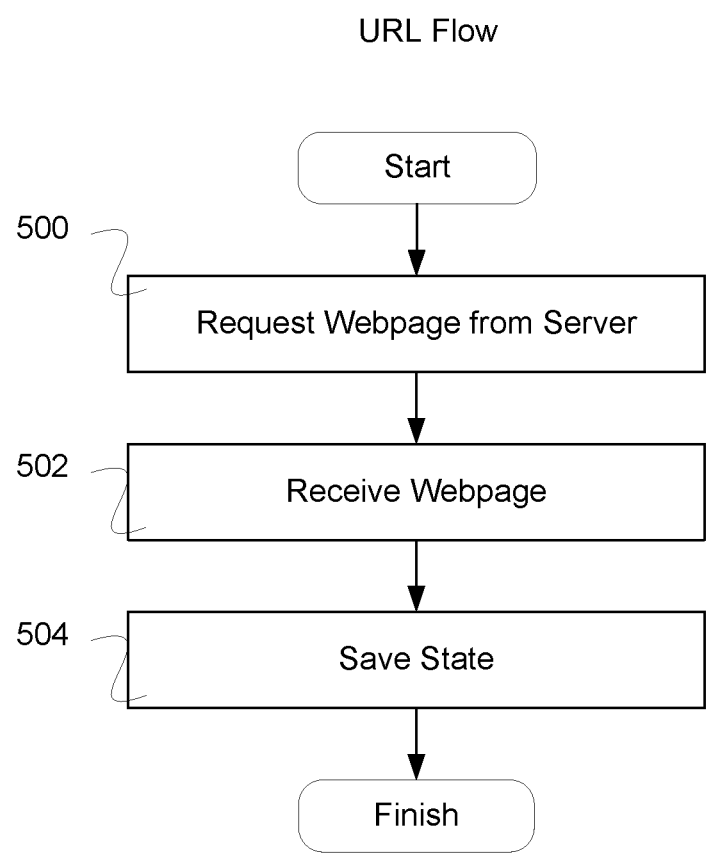
FIG. 5 is an embodiment of a flow diagram of a process for history management in response to a user entering a URL.

FIG. 5 is an embodiment of a flow diagram of a process for history management. In some embodiments, the process of FIG. 5 is used to implement 474 of FIG. 4D. In some embodiments, the URL flow is triggered by a user entering a URL in a URL box of a web browser application of the user system (e.g., user system 104 of FIG. 1). In the example shown, in 500 a web page is requested from a server. For example, a user entering a URL causes the display code to request the webpage associated with the URL from a server system. In some embodiments, the server system sends the webpage display information to the user system over a network. In 502, a web page is received. For example the webpage display information received from the system server. In various embodiments, the display information comprises Javascript, CSS, HTML, or any other appropriate information. The webpage associated with the URL entered is provided to be displayed on the web browser to the user. In 504, the state is saved. For example, the state of the display associated with the received web page is saved or stored (e.g., as a composite state in a browser history).

Figure 6:
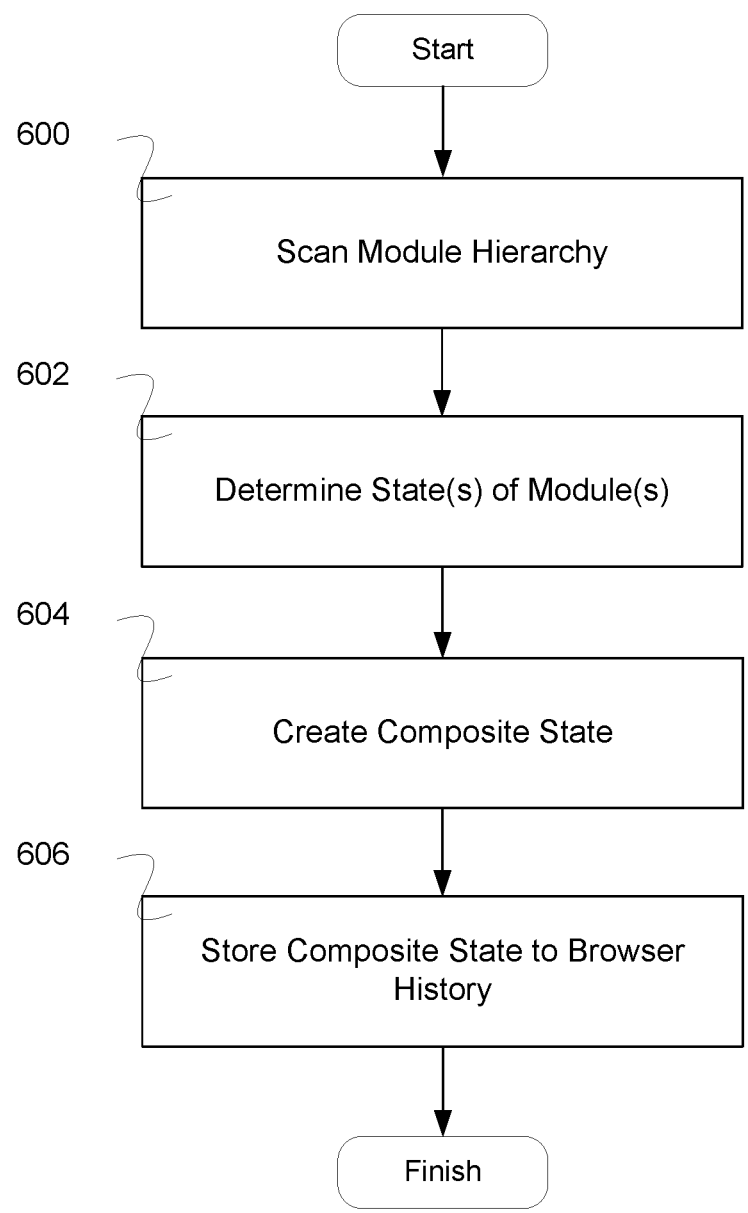
FIG. 6 is an embodiment of a flow diagram of a process for history management in response to a user selecting a webpage module.

FIG. 6 is an embodiment of a flow diagram of a process for history management. In some embodiments, the process flow of FIG. 6 is used to implement 476 of FIG. 4D. In various embodiments, selecting a module comprises clicking a tab, using a touch screen to select an email, causing the state of an outer module to change, and any other appropriate action. In the example shown, a user selection of a webpage module triggers the flow. In 600, a module hierarchy is scanned. For example, the selection causes the display code to scan a module hierarchy. In some embodiments, the state(s) of the module(s) in the module hierarchy are stored in a non-URL form. In some embodiments, the module hierarchy is created via a UI server. In some embodiments, the display code creates a representation of that hierarchy and scans the representation. In some embodiments, the display code scans only modules that are designated to have state to contribute to the composite state. In some embodiments, one or more modules displayed on the webpage are not designated to have multiple possible states. In some embodiments, one or more modules displayed are designated to have multiple possible states but to not contribute state to the composite state. In 602, state(s) of module(s) is/are determined. For example, the display code determines the state of each module designated to contribute state to the composite state. In some embodiments, the state of each module is determined while the scanning of the module hierarchy occurs. In 604, a composite state is created. For example, the display code creates a composite state comprising the URL of the webpage and any module state(s) stored in a non-URL format. In 606, a composite state is stored to a browser history. For example, the display code stores the composite display page state to the browser history.

Figure 7:
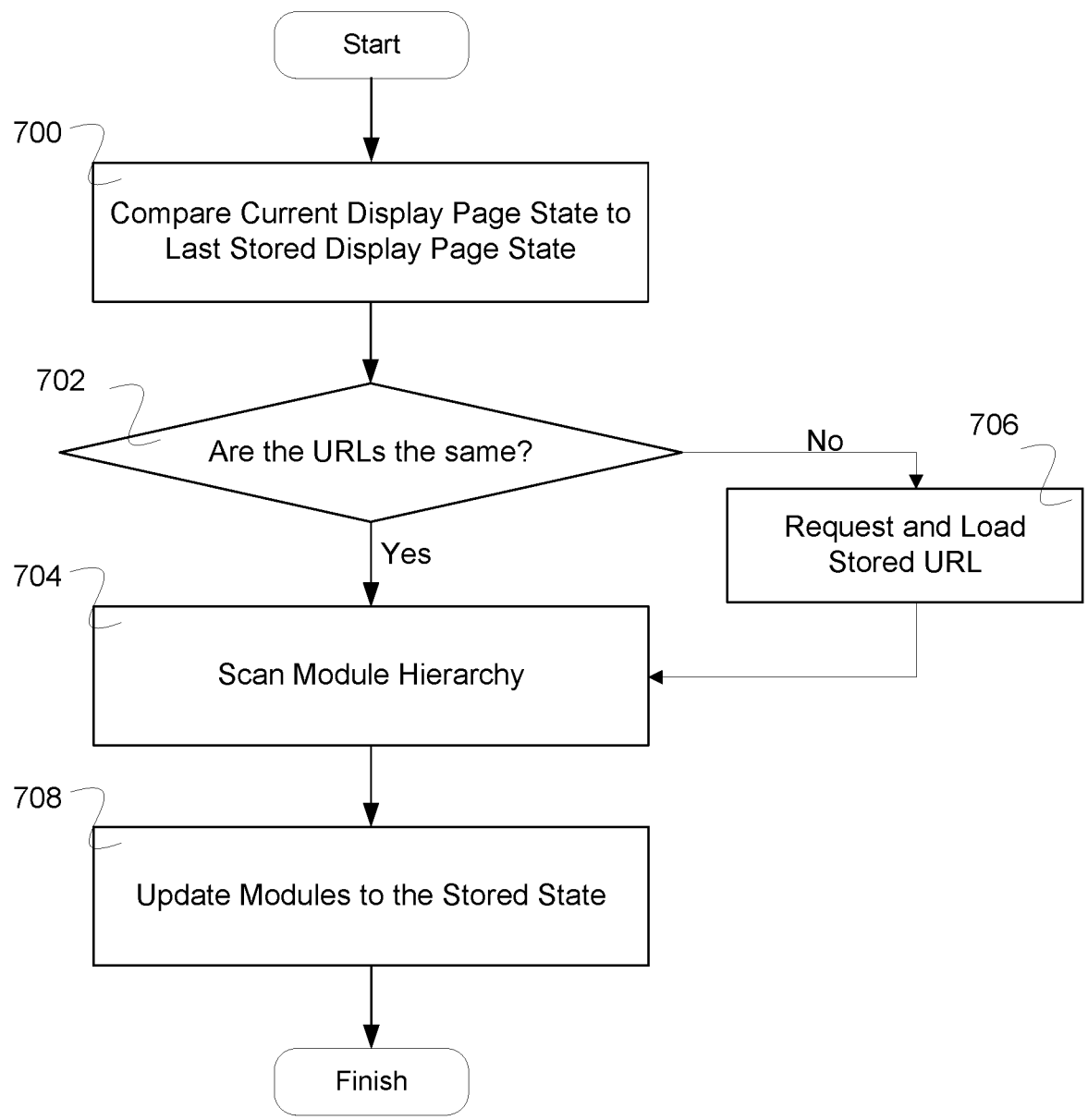
FIG. 7 is an embodiment of a flow diagram of a process for history management in response to a user selecting a refresh arrow.

FIG. 7 is an embodiment of a flow diagram of a process for history management. In some embodiments, the process flow of FIG. 7 is used to implement 478 of FIG. 4D. In some embodiments, a user selection of a refresh arrow of a web browser application of the user system triggers the flow. In various embodiments, selecting a refresh arrow comprises clicking an icon, using a touch screen to select a button, performing a keyboard shortcut, and any other appropriate action that sends a refresh indication. In some embodiments, the display code retrieves the last stored display window state from the browser history. In the example shown, in 700, current display page state is compared to the last stored display page state. For example, the refresh selection causes the display code to compare the current display page state to the last stored display page state. In 702, it is determined whether the URLs are the same. For example, the display code determines whether the URL of the current display page state is the same as the URL of the last stored display page state. In the event that the URLs are not the same, in 706 the stored URL is requested and loaded. For example, the display code requests the webpage associated with the stored URL from a server system. In the event that the URLs are the same, in 704 a module hierarchy is scanned. For example, the current URL is left unchanged, and the display code causes scanning a module hierarchy. In some embodiments, the state(s) of the module(s) in the module hierarchy are stored in a non-URL form. In some embodiments, the module hierarchy is created by a UI server. In some embodiments, the display code creates a representation of that hierarchy and scans the representation. In 708, modules are updated to the stored state. For example, the display code sets the state of each module of the module hierarchy according to the stored state. In some embodiments, the state of each module is updated when scanning of the module hierarchy occurs. The display page displayed to the user is updated to the stored state of the current display page. In some embodiments, the refresh results in the user being navigated to the same webpage the user refreshed on. In some embodiments, the refresh results in the user being navigated to a different webpage. In some embodiments, the difference in webpages is due to one or more modules that have state that is not stored as part of the composite state.

Figure 8:
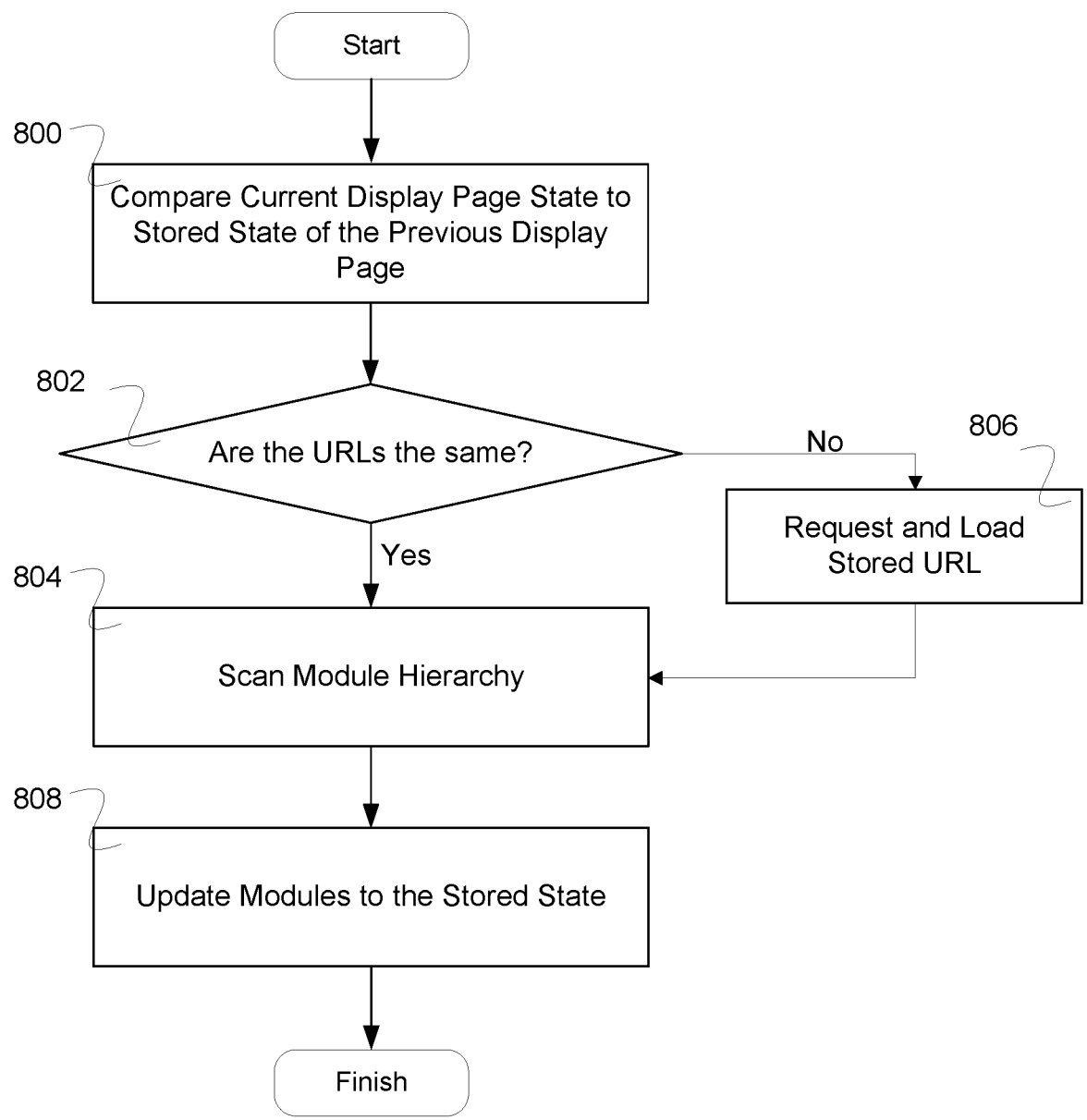
FIG. 8 is an embodiment of a flow diagram of a process for history management in response to a user selecting a back arrow.

FIG. 8 is an embodiment of a flow diagram of a process for history management. In some embodiments, the process of FIG. 8 is used to implement 480 of FIG. 4D. In some embodiments, a user selection of a back arrow triggers the flow. In some embodiments, the user selects a back arrow of a web browser application of the user system. In some embodiments, the user system comprises user system 104 of FIG. 1 or user system 250 of FIG. 2B. In various embodiments, selecting a back arrow comprises clicking an icon, using a touch screen to select a button, performing a keyboard shortcut, and any other appropriate user navigation that sends a back indication. In some embodiments, the display code retrieves the display window state of the previous display window from the browser history. In the example shown, in 800, the current display page state is compared to stored state of the previous display page. For example, the back selection causes the display code to compare the current display page state to the stored display page state of the previous display page. In some embodiments, the stored state of the previous display page is the second most recent addition to the browser history, the most recent addition being the current display page state. In 802, it is determined whether the URLs are the same. For example, the display code determines whether the URL of the current display page state is the same as the URL of the stored state of the previous display page. In the event the URLs are not the same, in 806 the stored URL is requested and loaded. For example, the display code requests the webpage associated with the stored URL from a server system. In the event that the URLs are the same, no change is done to the current URL and in 804 the module history is scanned. For example, the display code causes scanning a module hierarchy. In some embodiments, the state(s) of the module(s) in the module hierarchy are stored in a non-URL form. In some embodiments, the module hierarchy is created by a UI server. In some embodiments, the display code creates a representation of that hierarchy and scans the representation. In 808, modules to the stored state are updated. For example, the display code updates each module of the module hierarchy according to each module's stored state. In some embodiments, the state of each module is updated when scanning of the module hierarchy occurs. The display page displayed to the user is updated to the state of the previous display page.

Figure 9:
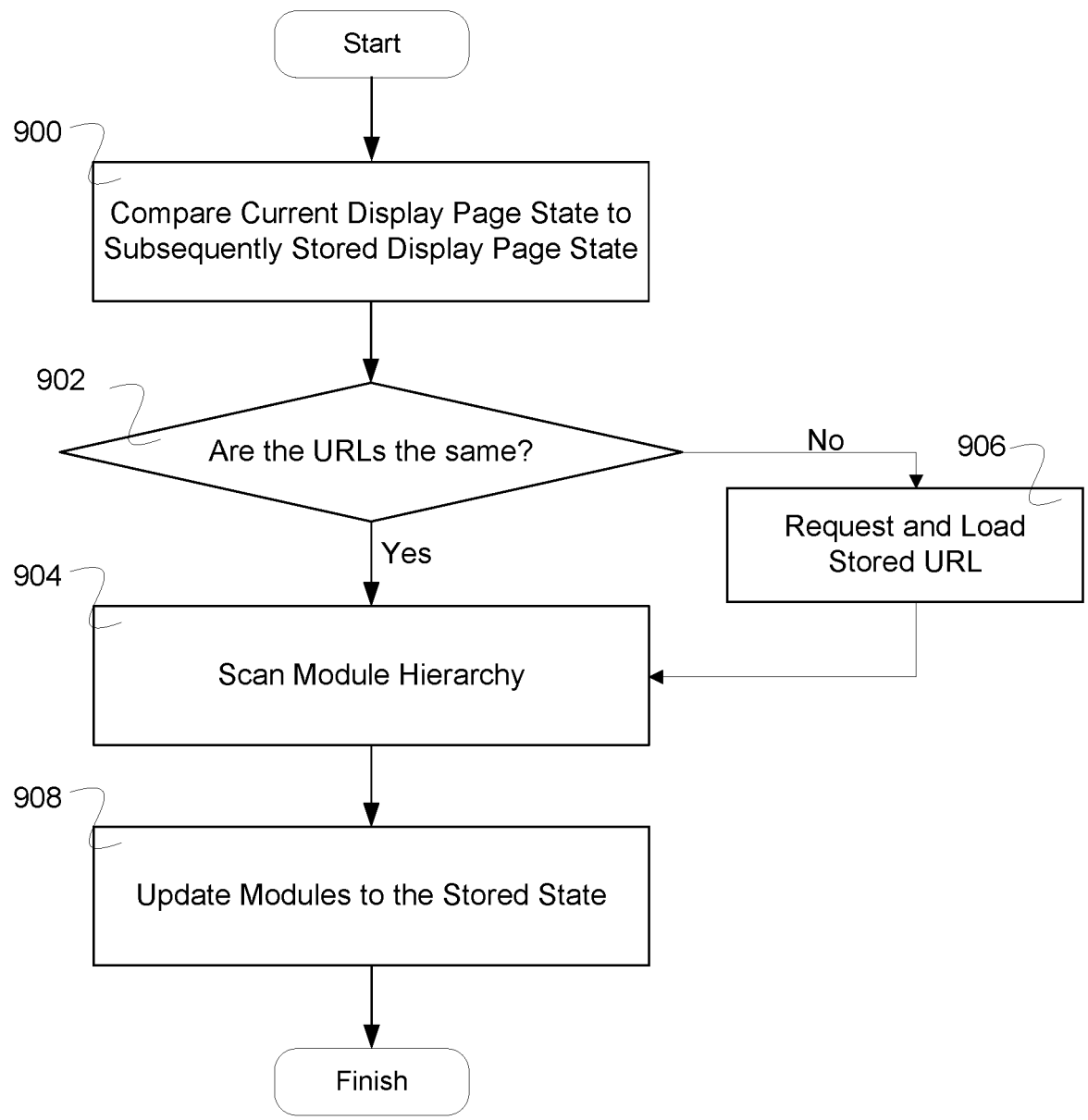
FIG. 9 is an embodiment of a flow diagram of a process for history management in response to a user selecting a forward arrow.

FIG. 9 is an embodiment of a flow diagram of a process for history management. In some embodiments, the process flow of FIG. 9 is used to implement 482 of FIG. 4D. In some embodiments, a user selection of a forward arrow triggers the flow. In some embodiments, the user selects a forward arrow of a web browser application of the user system. In various embodiments, selecting a forward arrow comprises clicking an icon, using a touch screen to select a button, performing a keyboard shortcut, and any other appropriate user navigation that sends a forward indication. In some embodiments, the display code retrieves the display window state of the subsequently stored display window from the browser history. In the example shown, in 900, a current display page state is compared to a subsequently stored display page state. For example, the forward selection causes the display code to compare the current display page state to the subsequently stored display page state. In some embodiments, the subsequent display page state was stored directly after the current display page state in the browser history. In 902, it is determined whether the URLs are the same. For example, the display code determines whether the URL of the current display page state is the same as the URL of the stored state of the subsequent display page. In the event that the URLs are not the same, in 906 the stored URL is requested and loaded. For example, the display code requests the webpage associated with the stored URL from a server system. In the event that the URLs are the same, no change is done to the current URL, and in 904 the module hierarchy is scanned. For example, the display code causes scanning a module hierarchy. In some embodiments, the state(s) of the module(s) in the module hierarchy are stored in a non-URL form. In some embodiments, the module hierarchy is created by a UI server. In some embodiments, the display code creates a representation of that hierarchy and scans the representation. In 908, the modules to the stored state are updated. For example, the display code updates each module of the module hierarchy according to each module's stored state. In some embodiments, the state of each module is updated when scanning of the module hierarchy occurs. The display page displayed to the user is updated to the state of the subsequent display page.

In some embodiments, a user is not allowed to select the back arrow unless the browser history comprises two or more display page states. In some embodiments, a user is not allowed to select the forward arrow unless the number of back arrow selections is greater than the number of forward arrow selections.

Figure 10A:
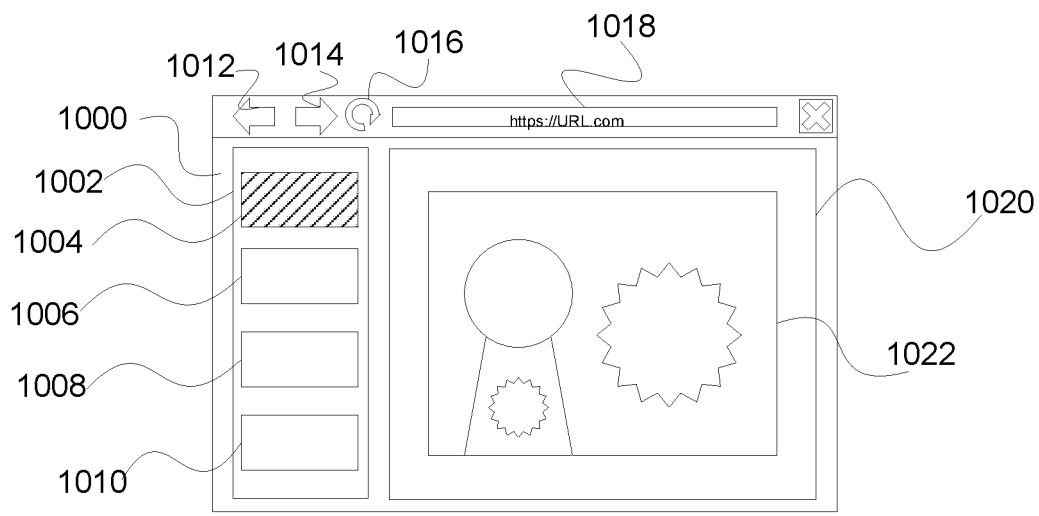
FIG. 10A is a diagram illustrating an embodiment of history management system applied to an inbox module.

FIG. 10A is a diagram of an embodiment of the display window code applied to an inbox module. In the example shown, the user is displayed a webpage by typing the URL of a webpage (e.g., an inbox webpage) into box 1018 and requesting that webpage from a server. Back arrow 1012, forward arrow 1014, and refresh arrow 1016 allow the user to navigate within a browser history—for example, to indicate to request the display of a prior webpage display, a subsequent webpage display, or the current webpage display of the sequence of webpage displays stored as part of the browser history. In various embodiments, the indication of the request to display is processed to provide the requested content, which is retrieved from a memory (e.g., a webpage cache memory, a server memory, etc.). In some embodiments, a first inbox list item 1004 is selected by default. In the example shown, list item 1004 is selected as indicated by the crosshatching. The modules on the webpage comprise the following: inbox module 1000, list container 1002, list item 1004, list item 1006, list item 1008, list item 1010, detail container 1020, and detail container 1022 (e.g., which is associated with a selected list item 1004 and displays content associated with the selected list item).

In the event of a user navigation of a selection of a window module, the display window code stores the state of a set of modules as a part of display page state history. In various embodiments, the set of modules comprises one or more modules displayed, all of the modules displayed, a subset of the modules displayed, a selected set of the modules displayed (e.g., selected by a developer), or any other appropriate set or subset of modules. In some embodiments, the display window code traverses a hierarchy of the module(s) on the webpage and determines an indicator of state for each module. In some embodiments, if the module has state designated to be stored, the display window code stores the module state as part of a composite state. In some embodiments, the display window code determines which portions of the composite state to store using a webpage URL and which portions to store in the browser memory. In an embodiment of FIG. 10A, only inbox module 1000 has state. The inbox state describing the selection of list item 1004 is stored in the browser memory. In some embodiments, the decisions on which modules have state and where that state is stored are made by the module developer. The composite state is stored so that it can be retrieved and used to display the webpage display to the user when the user navigates to the page (e.g., using an index structure or identifier to retrieve associated portions of the state from the storing locations for the state history). In the embodiment of FIG. 10A, the composite history of the webpage comprises the URL of the initial inbox display and the non-URL state describing the inbox selection of the first list item.

Figure 10B:
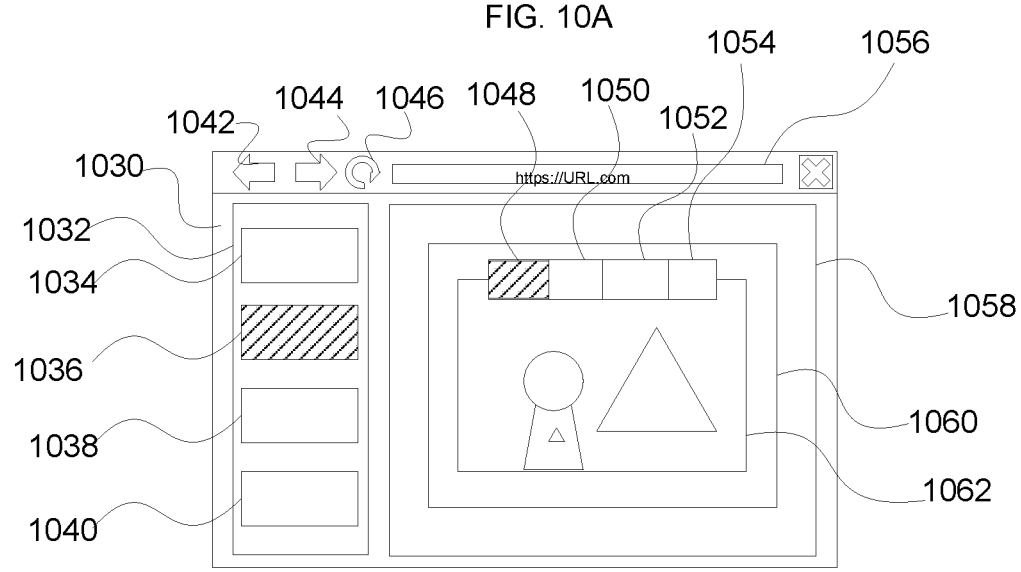
FIG. 10B is a diagram illustrating an embodiment of history management system applied to an inbox module.

FIG. 10B is a diagram of an embodiment of the display window code applied to an inbox module. In some embodiments, the display of FIG. 10B comprises a display screen provided to the user after the user clicks a second list item of the left hand list (e.g., list item 1006) within FIG. 10A. In the example shown, URL box 1056 enables a user to enter a URL that causes the display to show content associated with the URL. Back arrow 1042, forward arrow 1044, and refresh arrow 1046 allow the user to navigate to display pages stored in the browser state history. In some embodiments, the navigation causes a request to be sent to a server to retrieve appropriate content to display in each of the modules that had stored state information in the state history. In some embodiments, the content of second list item 1036 is detail container 1060, which comprises a list formatted with tabs with first tab 1048 shown as being selected (i.e., indicated by the crosshatching). In some embodiments, first tab 1048 is selected by default upon selecting list item 1036. In the event that a user selection of a module of the display changes the display page state, the state of the display is caused to be retrieved or determined and stored as part of a sequential set of states as part of a display state history. In some embodiments, the display window code scans a hierarchy of modules. In the example shown, the modules on the webpage comprise the following: inbox module 1030, list container 1032, list item 1034, list item 1036, list item 1038, list item 1040, detail container 1058, detail container 1060 (e.g., a container associated with displaying list item 1036's content), tab 1048 (which is shown as selected indicated by the crosshatching), tab 1050, tab 1052, tab 1054, and detail container 1062 (e.g., a container associated with displaying tab 1048's content). In some embodiments, the display window code scans a module hierarchy of the module(s) displayed on the webpage and finds that modules inbox 1030 and second list item 1036 have been designated to have their state stored as part of the display page state history. The code compiles the composite history of the selected modules and stores the composite history. In some embodiments, the composite browser history is stored in the web browser memory of the user system (e.g., user system 104 of FIG. 1). In some embodiments, the composite history comprises the URL of the initial inbox display and the states stored in the browser memory describing the inbox selection of second list item 1036 and the list item 1036 selection of tab 1048.

Figure 10C:
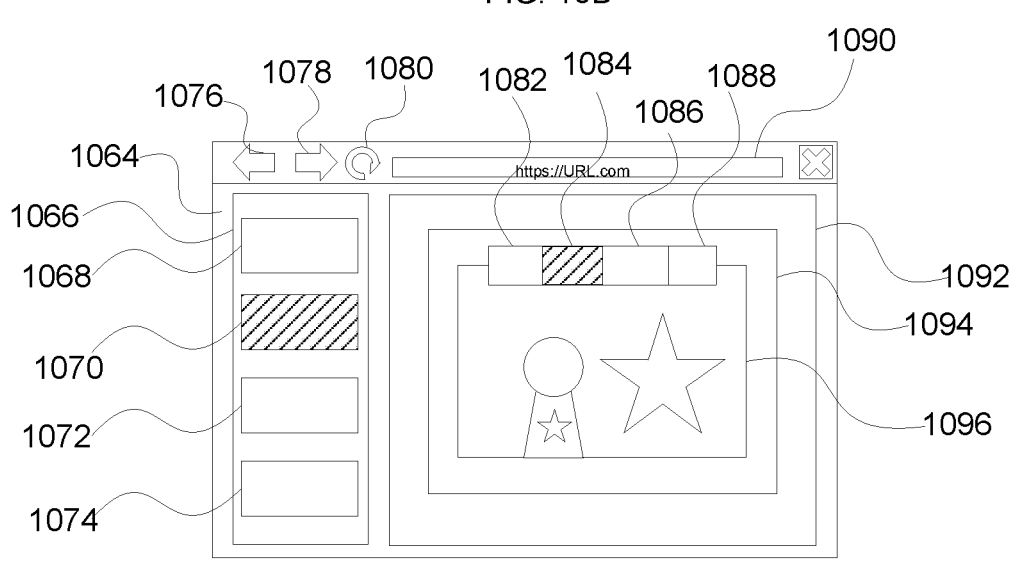
FIG. 10C is a diagram illustrating an embodiment of history management system applied to an inbox module.

FIG. 10C is a diagram of an embodiment of the display window code applied to an inbox module. In some embodiments, the display of FIG. 10C comprises a display to a user after the user clicks a tab within a detail container module (e.g., the second tab item, tab 1050, within detail container 1060 of FIG. 10B). In the example shown, back arrow 1076, forward arrow 1078, refresh arrow 1080, and URL box 1090 allow the user to navigate to a display window. In some embodiments, an indication using these navigation tools sends a request to the system to retrieve content to display (e.g., from a memory, from a content server, etc.). A change to the state of a module (e.g. by a user click) causes the display window code to commit the state of the display to history. In some embodiments, the display window code scans a module hierarchy to determine a state history for the module(s) displayed, consolidates the state(s) into a composite history entry, and stores the composite state history entry in a display page state history. The modules on the webpage comprise the following: inbox module 1064, list container 1066, list item 1068, list item 1070 (shown as selected indicated using crosshatching), list item 1072, list item 1074, detail container 1092, detail container 1094 (displaying list item 1070's content), tab 1082, tab 1084 (shown as selected indicated using crosshatching), tab 1086, tab 1088, and detail container 1096 (displaying list item 1084's content). In some embodiments, the inbox module state does not include state information associated with the list container nested within it, and the list container module state does not include state information associated with the inbox module outside of it. In some embodiments, it is the choice of the parent container and not the nested state module (e.g., the window module containing the tabs) as to whether state of a nested container is included or not included in the parent container. In some embodiments, the code determines modules inbox 1064 and list item 1070 to have been designated to have state that is to be stored as part of the composite state. In some embodiments, the code compiles a composite display page state comprising the URL of the initial inbox display and the states stored in the browser memory describing the inbox selection of second list item 1070 and the list item 1070 selection of second tab 1084.

In some embodiments, a user selection of the second tab of FIG. 10B causes FIG. 10C to be displayed. In some embodiments, a user navigation of back button 1076 causes the display window code to compare the current display window state to the display window state that was stored previously in the browser history. In some embodiments, the code determines the URLs are the same and does not request the server system for information. In some embodiments, the display window code scans a module hierarchy and updates the state of the inbox and second list item modules based on their states stored as part of the composite state of the previous webpage. In some embodiments, the resulting display window displayed to the user is FIG. 10B. In some embodiments, a user selection of forward arrow 1044 of FIG. 10B causes the display window code to compare the current display window state to the display window state that was stored subsequently after the current display window state in the browser history. In some embodiments, the code determines the URLs are the same. In some embodiments, the display window code scans a module hierarchy and updates the state of the inbox and second list item modules. In some embodiments, the resulting display window shown to the user is FIG. 10C.

In some embodiments, a user types a new URL into box 1090 of webpage 10C to navigate to a new webpage. In some embodiments, the display code requests the server system for the display information associated with that URL and then loads the webpage. In some embodiments, the user clicks back button 1076 from the loaded webpage. In some embodiments, the display window code compares the current display window state of the loaded webpage to the display window state that was stored previously in the browser history which describes FIG. 10C. In some embodiments, the display window code determines the URLs are different, and requests the server system for the display information associated with the URL of FIG. 10C. In some embodiments, the display window code loads the URL of FIG. 10C and scans a module hierarchy, updating the state of the inbox and second list item modules. In some embodiments, the user is navigated to the window display of FIG. 10C.

In some embodiments, a user clicks refresh arrow 1080 on webpage 10C, prompting the display window code to reload the most recent state it wrote to the browser history. In some embodiments, the URL of the current webpage is the same as the URL of the most recent state written to browser history. In some embodiments, the server is not requested for display information based on a URL. In some embodiments, the display window code scans a hierarchy of the module(s) that have state stored in the browser memory, in this case the inbox and list item modules, and updates them to their stored states. In some embodiments, the user is navigated to the window display of FIG. 10C.

In some embodiments, second list item 1070 in FIG. 10C is designated to have state but not contribute its state to the composite state (e.g. via a developer decision). In some embodiments, a user types a new URL into box 1090 of FIG. 10C to navigate to a new webpage and then clicks back button 1076. In some embodiments, the user is navigated to webpage 10B by the display window code, with the default first tab 1048 selected. In some embodiments, a user views webpage 10C and then clicks the refresh button and is navigated to webpage 10B by the display window code. In some embodiments, the user is navigated to webpage 10B rather than webpage 10C because the state of the list item was suppressed and not written in the browser history. In some embodiments, the user is navigated to webpage 10A rather than webpage 10C because the state of the list item was suppressed and not written in the browser history.

Figure 10D:
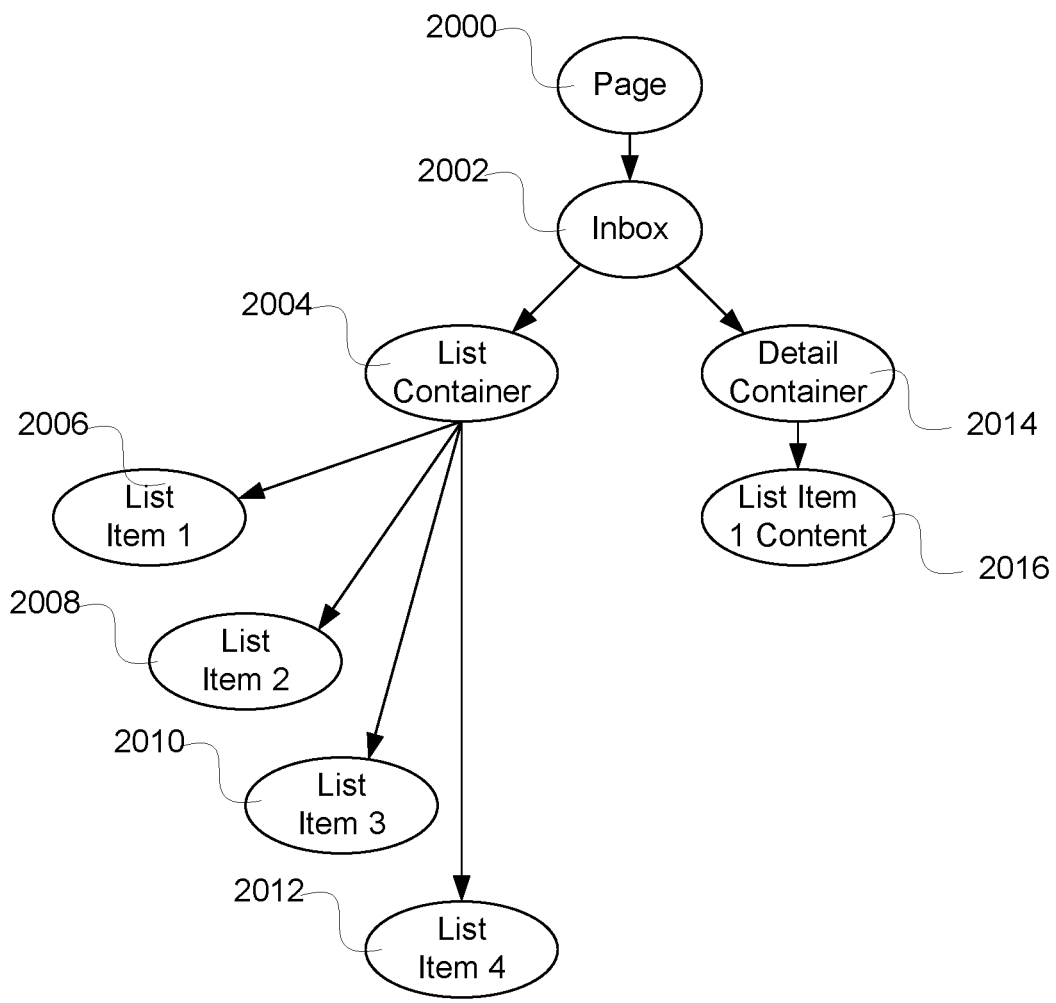
FIG. 10D is a diagram illustrating an embodiment of a tree of widgets.

FIG. 10D is a diagram illustrating an embodiment of a tree of widgets. In some embodiments, a widget corresponds to a display element or component (e.g., a list, a list container, a module, a page, an inbox, a detail container, a container, a list item, an item, etc.). In some embodiments, the tree of widgets of FIG. 10D is associated with the inbox widget of FIG. 10A. In the example shown, a tree of widgets comprises page widget 2000 that is associated with inbox widget 2002. Inbox widget 2002 is associated with list container widget 2004 and detail container widget 2014. List container widget 2004 is associated with list item 1 widget 2006, list item 2 widget 2008, list item 3 widget 2010, and list item 4 widget 2012. Detail container widget 2014 is associated with list item 1 content widget 2016. The tree of widgets is traversed to check for stateful widgets. The inbox state is found and in the embodiment shown is the only stateful widget on the page. The state in this case is the only node located in the new state tree. It records the item selected, the display mode as showing both the list and detail containers and in the embodiment shown also noting that the user did not force the detail container to be fullscreen. The inbox state is non-bookmarkable, so the state is stored in the JSON object for this history item. The URL and the JSON state is written to the browser history. For example, the inbox state, the URL, and JSON include:
Inbox state:
LastSelectedItem: "ListItem1"
DisplayMode: "DUAL_PANE"
CurrentViewDisplay: "BOTH"
UserForcedFullscreen: "false"
URL:
inbox.html
JSON State:
{
"LastSelectedItem": "ListItem1"
DisplayMode: "DUAL_PANE"
CurrentViewDisplay: "BOTH"
UserFrocedFullscreen: "false"
}

Figure 10E:
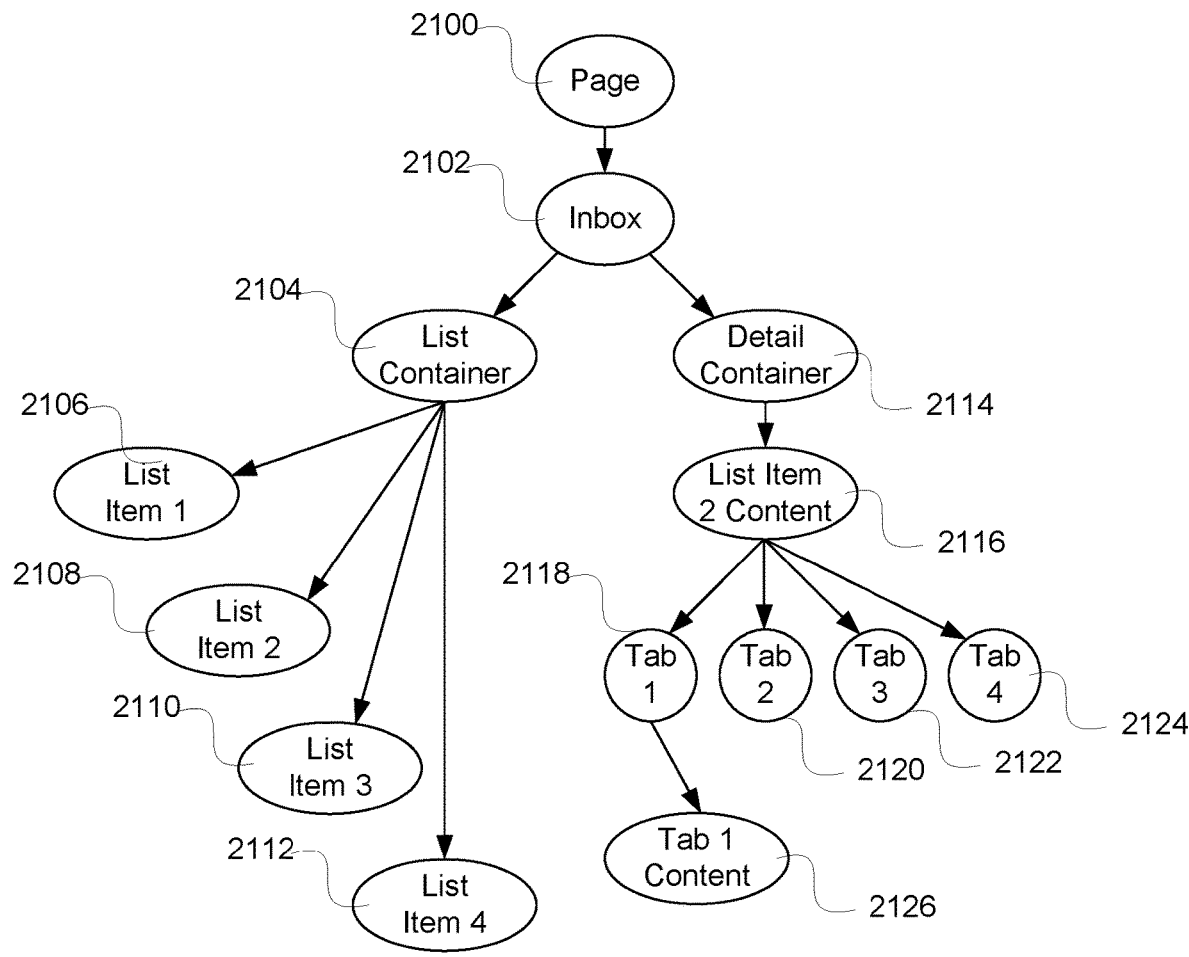
FIG. 10E is a diagram illustrating an embodiment of a tree of widgets.

FIG. 10E is a diagram illustrating an embodiment of a tree of widgets. In some embodiments, the tree of widgets of FIG. 10E is associated with the inbox widget of FIG. 10B. In the example shown, a tree of widgets comprises page widget 2100 that is associated with inbox widget 2102. Inbox widget 2102 is associated with list container widget 2104 and detail container widget 2114. List container widget 2104 is associated with list item 1 widget 2106, list item 2 widget 2108, list item 3 widget 2110, and list item 4 widget 2112. Detail container widget 2114 is associated with list item 2 content widget 2116. List item 2 content widget 2116 is associated with tab 1 widget 2118, tab 2 widget 2120, tab 3 widget 2122, and tab 4 widget 2124. Tab 1 content widget 2126 is associated with tab 1 widget 2118. The tree of widgets has changed from the state depicted in the tree of widgets of FIG. 10D and is traversed to check for stateful widgets. The inbox state is found as well as the list item 2 content's tab widget—tab 1 widget. The state tree now contains two nodes with the inbox state on top and the tab state as its child. The inbox state changed its selected item to be the second list item, and the second list items contains state with the first tab selected. The inbox state is non-bookmarkable, so the state is stored in the JSON object for this history item. The tab state is bookmarkable, so the tab state is stored to the URL. The URL and the JSON state is written to the browser history. For example, the inbox state, the URL, and JSON include:
Inbox state:
LastSe ectedItem: "ListItem2"
DisplayMode: "DUAL_PANE"
CurrentViewDisplay: "BOTH"
UserFrocedFullscreen: "false"
List item 2 content state:
SelectedTab: "1"
URL:
inbox.html#selectedTab=1
JSON State:
{
"LastSelectedItem": "ListItem2"
DisplayMode: "DUAL_PANE"
CurrentViewDisplay: "BOTH"
UserFrocedFullscreen: "false"
}

Figure 10F:
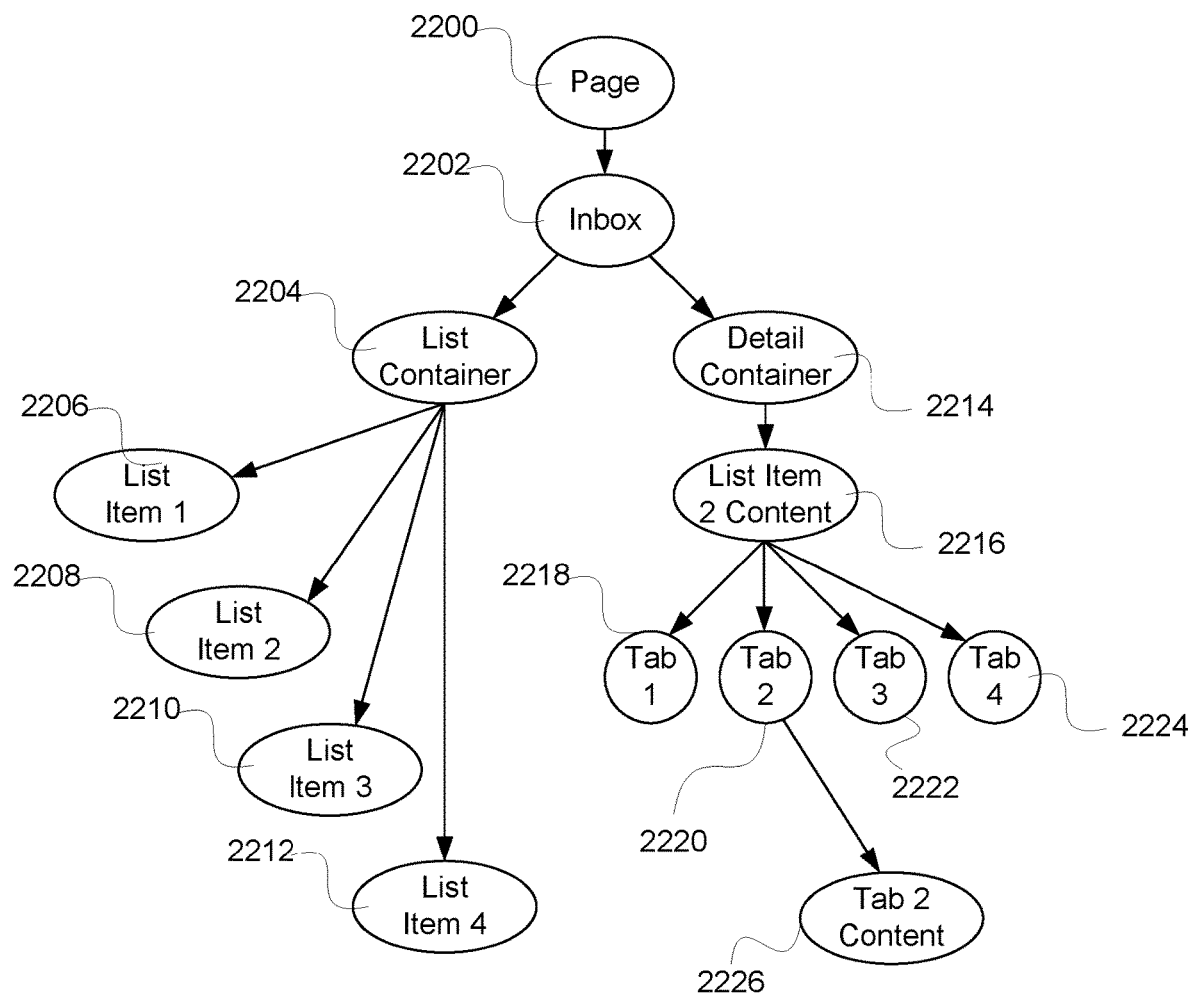
FIG. 10F is a diagram illustrating an embodiment of a tree of widgets.

FIG. 10F is a diagram illustrating an embodiment of a tree of widgets. In some embodiments, the tree of widgets of FIG. 10F is associated with the inbox widget of FIG. 10C. In the example shown, a tree of widgets comprises page widget 2200 that is associated with inbox widget 2202. Inbox widget 2202 is associated with list container widget 2204 and detail container widget 2214. List container widget 2204 is associated with list item 1 widget 2206, list item 2 widget 2208, list item 3 widget 2210, and list item 4 widget 2212. Detail container widget 2214 is associated with list item 2 content widget 2216. List item 2 content widget 2216 is associated with tab 1 widget 2218, tab 2 widget 2220, tab 3 widget 2222, and tab 4 widget 2224. Tab 2 content widget 2226 is associated with tab 2 widget 2220. The tree of widgets has changed from the state depicted in the tree of widgets of FIG. 10E and is traversed to check for stateful widgets. The inbox state is found as well as the list item 2 content's tab widget—tab 2 widget. The state tree now contains two nodes with the inbox state on top and the tab state as its child. The inbox state changed its selected item to be the second list item, and the second list items contains state with the second tab selected. The inbox state is non-bookmarkable, so the state is stored in the JSON object for this history item. The tab state is bookmarkable, so the tab state is stored to the URL. The URL and the JSON state is written to the browser history. For example, the inbox state, the URL, and JSON include:
Inbox state:
LastSelectedItem: "ListItem2"

DisplayMode: "DUAL_PANE"
CurrentViewDisplay: "BOTH"
UserFrocedFullscreen: "false"
List item 2 content state:
SelectedTab: "2"
URL:
inbox.html#selectedTab=2
JSON State:
{
"LastSelectedItem": "ListItem2"
DisplayMode: "DUAL_PANE"
CurrentViewDisplay: "BOTH"
UserFrocedFullscreen: "false"
}

Figure 11A:
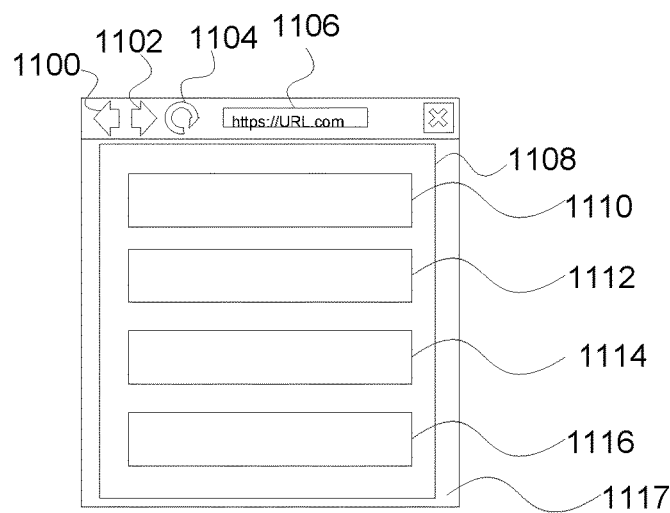
FIG. 11A is a diagram illustrating an embodiment of history management system applied to an inbox module with an inbox state corresponding to the size of the display window.

FIG. 11A is a diagram of an embodiment of the browser display window code applied to an inbox with a state corresponding to the size of the display window. In some embodiments, the display of FIG. 11A comprises a size sensitive display showing a list container module of an inbox (e.g., list container 1002 of inbox 1000 of FIG. 10A). In some embodiments, it is the inbox window module itself that is size sensitive. For example, the application is aware of the browser's window size, which then notifies the window module of the window size, and reacts accordingly. In the example shown, back arrow 1100, forward arrow 1102, refresh arrow 1104, and URL box 1106 allow the user to indicate desired content to display. The arrows allow the user to navigate within a browser history—for example, back arrow 1100, forward arrow 1102, and refresh arrow 1104 allow a user to indicate to request the display of a prior webpage display, a subsequent webpage display, or a current webpage display of the sequence of webpage displays stored as part of the browser history, respectively. The URL box allows a user to navigate to a webpage associated with the URL entered. In various embodiments, the content for the webpage display is retrieved from a server, a memory, or any other appropriate content storage. In some embodiments, in the event that the webpage window size is small, a partial display state is triggered in the inbox module. In some embodiments, in the partial display state, an enlarged portion of the inbox is shown in order to be more readable. In some embodiments, another inbox state defines which portion of the inbox is enlarged and shown. Upon a request to store the display window state to history, the display window code scans a module hierarchy. In FIG. 11A, the modules on the webpage comprise inbox 1117, list container 1108, list item 1110, list item 1112, list item 1114, and list item 1116. In the example shown, the display window code determines that inbox module 1117 has state that has been selected to be stored as part of a composite state (e.g., by a developer). In some embodiments, the state of inbox module 1117 stored in the browser memory describes that no list item has been selected, the list container is displayed, and partial display mode is on. In some embodiments, the composite display window state stored in the browser history comprises the inbox state stored in the browser memory and the URL of the initial inbox display.

Figure 11B:
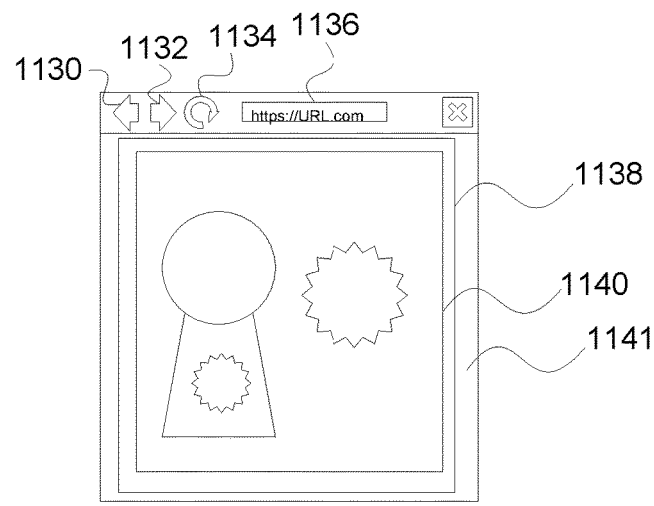
FIG. 11B is a diagram illustrating an embodiment of history management system applied to an inbox module with an inbox state corresponding to the size of the display window.

FIG. 11B is a diagram of an embodiment of the browser display window code applied to an inbox with a state corresponding to the size of the display window. In some embodiments, the display of FIG. 11B comprises a display after first inbox list item 1110 of FIG. 11A is selected by the user. In some embodiments, a change to the state of the webpage (e.g., associated with a click by a user) causes a request to the display window code to commit the display window state to the browser history. In the example shown, back arrow 1130, forward arrow 1132, refresh arrow 1134, and URL box 1136 allow the user to navigate between display windows. In some embodiments, a navigation indication causes a request to be sent to a server to retrieve content associated with the display window state navigated to. The modules on webpage 11B comprise the following: inbox module 1141, detail container 1138 and detail container 1140 (e.g., displaying content associated with a selected list item—for example, list item 1110). In some embodiments, the display window code determines that inbox module is the only module designated to have state to be stored as part of the composite state. In some embodiments, following the navigation from FIG. 11A to FIG. 11B, the display window code compiles the composite history entry, comprising the URL of the initial inbox display and the inbox state stored in browser memory that describes that the first list item has been selected, the detailed view of a list item's content is displayed (i.e., the content is displayed on the full display window rather than the list items of FIG. 11A) and partial display mode is on.

Figure 11C:
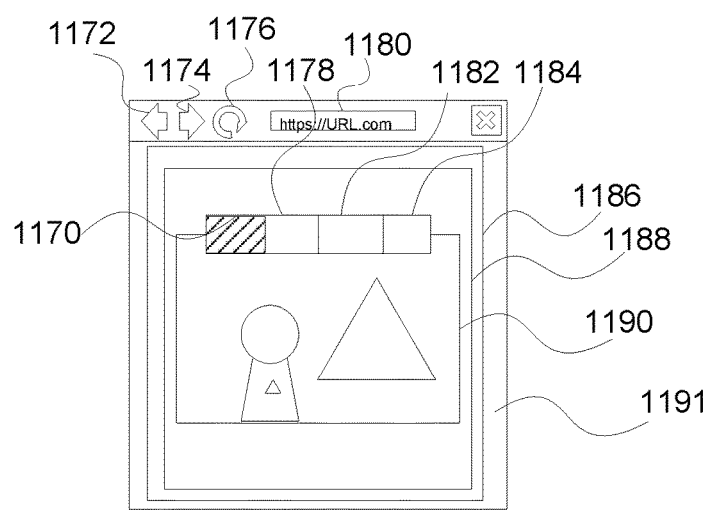
FIG. 11C is a diagram illustrating an embodiment of history management system applied to an inbox module with an inbox state corresponding to the size of the display window.

FIG. 11C is a diagram of an embodiment of the browser display window code applied to an inbox with a state corresponding to the size of the display window. In some embodiments, the display of FIG. 11C comprises a display of a webpage after a second inbox list item is selected by the user (e.g., list item 1112 of FIG. 11A). In some embodiments, the user module selection causes the display window code to store the new display page state. In the example shown, back arrow 1172, forward arrow 1174, refresh arrow 1176, and URL box 1180 allow the user to navigate between display windows. In some embodiments, a navigation indication causes a request to be sent to a server to retrieve content associated with the display window state navigated to. List item content 1188 is a tabbed list container. Therefore, content 1188 is a tabbed list container module within a list item module. The modules on the webpage comprise the following: inbox module 1191, detail container 1186, display container 1188 that displays content associated with the selected list item, tab 1170 (indicated as selected using cross hatching), tab 1178, tab 1182, tab 1184, and detail container 1190 (displaying content associated with selected tab 1170). In some embodiments, the user selection of a list item module causes the display code to compile a composite display page state for the webpage. The composite history entry comprises the URL of the initial inbox display and the states stored in browser memory. In some embodiments, the inbox state stored in browser memory describes that the second list item (e.g., list item 1112 of FIG. 11A) has been selected, the detailed view of a list item's content is displayed (i.e., the content is displayed on the full display window rather than the list items of FIG. 11A) and partial display mode is on. In some embodiments, the second list item (e.g., list item 1112 of FIG. 11A) state stored in browser memory describes that first tab 1170 is selected. The composite history entry is then written to the browser history. This embodiment is an example of how the state management system provides other state attributes to the browser, such as automatically adjusting for the size of the screen.

In some embodiments, a user viewing display FIG. 11C clicks on second tab 1178, changing the list item state. In some embodiments, the user then clicks back button 1172. In some embodiments, the display window code retrieves the display window state of the previous webpage and compares the current display window state to the display window state in browser history of the previous display window. In some embodiments, the display window code determines the URLs are the same and scans a module hierarchy, updating the inbox and second list item modules according to their states stored in the previous webpage's browser history entry. In some embodiments, the user is displayed the window display of FIG. 11C. In some embodiments, the user clicks forward arrow 1174. In some embodiments, the display window code compares the current display window state to the display window state that was stored subsequently after the current display window state in the browser history. In some embodiments, the code determines the URLs are the same and scans a module hierarchy, updating the inbox and second list item modules according to their states stored in the subsequent webpage's browser history entry. In some embodiments, the resulting display window displays the content of second tab 1178.

In some embodiments, a user types a new URL into box 1180 of webpage 11C to navigate to a new webpage. In some embodiments, the display code requests the server system for the display information associated with that URL and then loads the webpage. In some embodiments, the user clicks back button 1172 from the loaded webpage. In some embodiments, the display window code compares the current display window state of the loaded webpage to the display window state that was stored previously in the browser history which describes FIG. 11C. In some embodiments, the display window code determines the URLs are different, and requests the server system for the display information associated with the URL of FIG. 11C. In some embodiments, the display window code loads the URL of FIG. 11C and scans a module hierarchy, updating the state of the inbox and second list item modules. In some embodiments, the user is navigated to the window display of FIG. 11C.

In some embodiments, a user clicks refresh arrow 1176 on webpage 11C, prompting the display window code to reload the most recent state it wrote to the browser history. In some embodiments, the URL of the current webpage is the same as the URL of the most recent state written to browser history. In some embodiments, the server is not requested for display information based on a URL. In some embodiments, then the display window code scans a hierarchy of the module(s) that have state stored in the browser memory, in this case the inbox and list item modules, and updates them to their stored states. In some embodiments, the user is navigated to the window display of FIG. 11C.

In some embodiments, the state of the inbox module describing which list item is selected and the state of the list item module in FIG. 11C are designated not to be stored as part of the composite state while the inbox state describing partial view turned on is designated to be stored as part of the composite state. In some embodiments, a user types a new URL into box 1180 of FIG. 11C to navigate to a new webpage and then clicks back button 1172. In some embodiments, the user is navigated to webpage 11A by the display window code. In some embodiments, a user views webpage 11C and then clicks the refresh button and is navigated to webpage 11A by the display window code. In some embodiments, the user is navigated to webpage 11A rather than webpage 11C because the state of the inbox describing which list item is selected and the state of the module contained in the list item were suppressed and not written in the browser history.

Figure 11D:
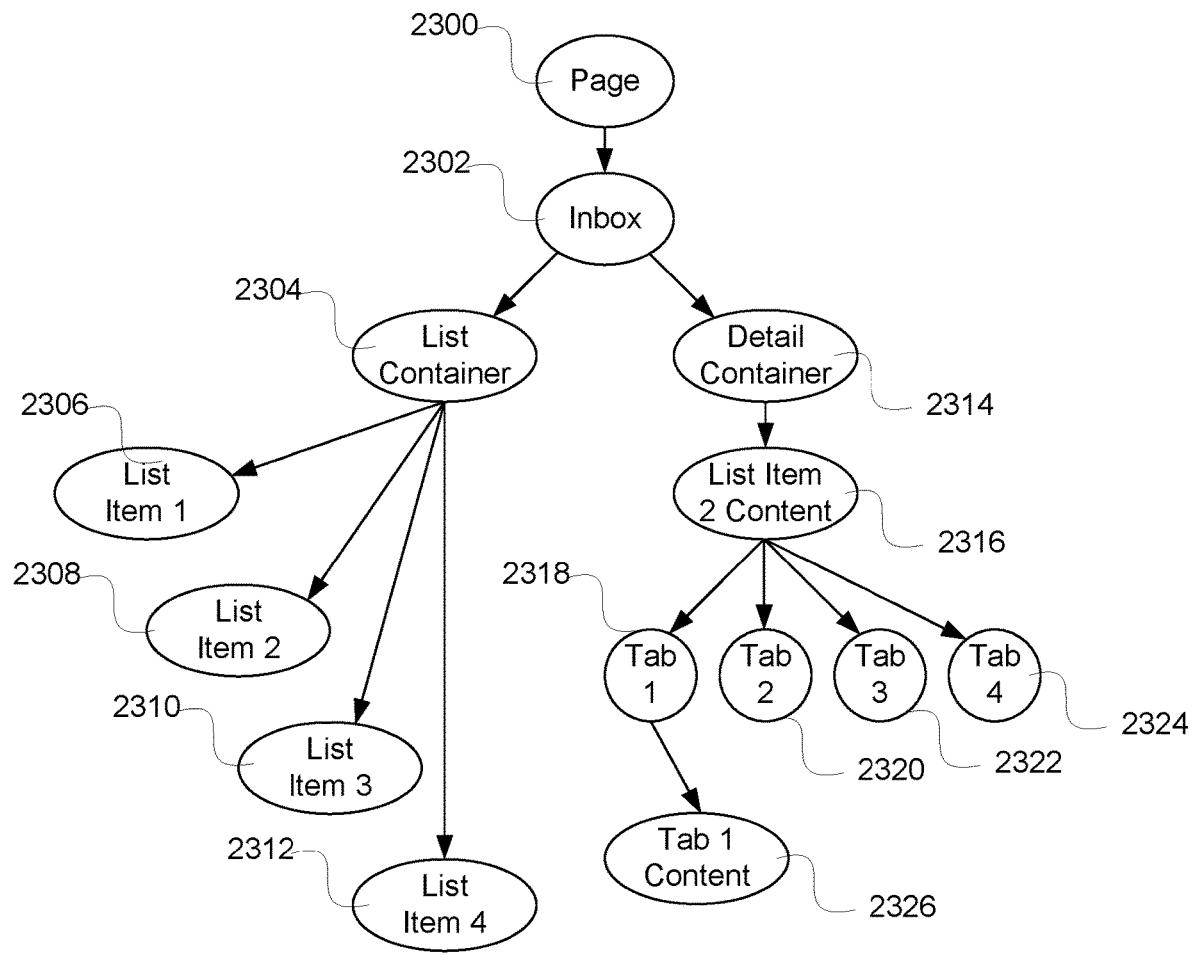
FIG. 11D is a diagram illustrating an embodiment of a tree of widgets.

FIG. 11D is a diagram illustrating an embodiment of a tree of widgets. In some embodiments, the tree of widgets of FIG. 11D is associated with the widgets of FIGS. 11A-C. In the example shown, a tree of widgets comprises page widget 2300 that is associated with inbox widget 2302. Inbox widget 2302 is associated with list container widget 2304 and detail container widget 2314. List container widget 2304 is associated with list item 1 widget 2306, list item 2 widget 2308, list item 3 widget 2310, and list item 4 widget 2312. Detail container widget 2314 is associated with list item 2 content widget 2316. List item 2 content widget 2316 is associated with tab 1 widget 2318, tab 2 widget 2320, tab 3 widget 2322, and tab 4 widget 2324. Tab 1 content widget 2326 is associated with tab 1 widget 2318. The tree of widgets is traversed to check for stateful widgets. The inbox state is found as well as the list item 2 content's tab widget—tab 1 widget. The state tree now contains two nodes with the inbox state on top and the tab state as its child. The inbox state changed its selected item to be the second list item, and the second list items contains state with the first tab selected. The inbox state is non-bookmarkable, so the state is stored in the JSON object for this history item. The tab state is bookmarkable, so the tab state is stored to the URL. The URL and the JSON state is written to the browser history. For example, the inbox state, the URL, and JSON include:

Inbox state:
LastSelectedItem: "ListItem2"
DisplayMode: "SINGLE_PANE"
CurrentViewDisplay: "DETAIL"
UserFrocedFullscreen: "false"
List item 2 content state:
SelectedTab: "1"
URL:
inbox.html#selectedTab=1
JSON State:
{
"LastSelectedItem": "ListItem2"
DisplayMode: "SINGLE_PANE"
CurrentViewDisplay: "DETAIL"
UserFrocedFullscreen: "false"
}

Figure 12A:
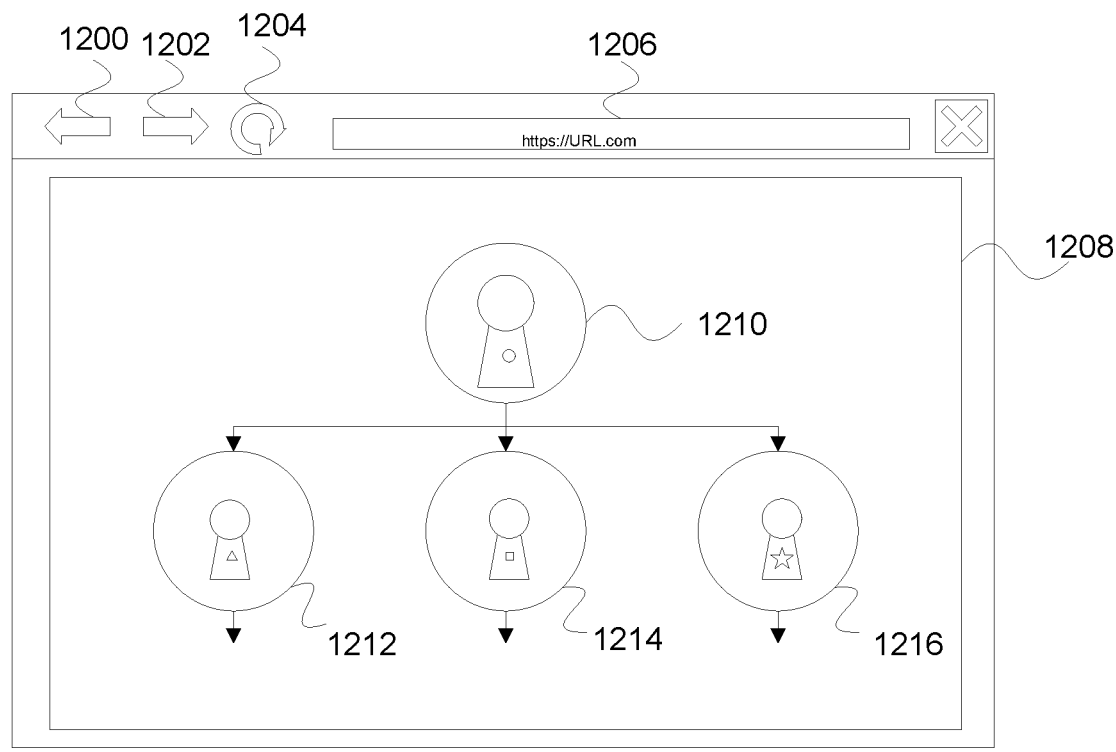
FIG. 12A is a diagram illustrating an embodiment of history management system applied to an organizational chart module.

FIG. 12A is a diagram of an embodiment of the browser display window code applied to a company's organizational chart of employees. In the example shown, back arrow 1200, forward arrow 1202, refresh arrow 1204, and URL box 1206 allow the user to navigate between display windows. In some embodiments, navigation indication results in a request being sent to the server. The modules on the webpage comprise the following: person node 1210, person node 1212, person node 1214, person node 1216, and organizational chart module 1208. In some embodiments, the only module with an indication that state is to be stored is organizational chart module 1208. In the example shown, the chart module's state describes that the open node is 1210 and the selected node is 1214. In some embodiments, nodes that are open have their children nodes, if existent, linked below them. In some embodiments, the selected node and the selected node's children, if existent, are guaranteed to be shown on the window display. In some embodiments, the state of the chart module is stored in the browser memory in a non-URL format. In some embodiments, the composite memory compiled by the display window code comprises the URL pointing to the initial organization chart webpage and the state of the chart module stored in browser memory.

Figure 12B:
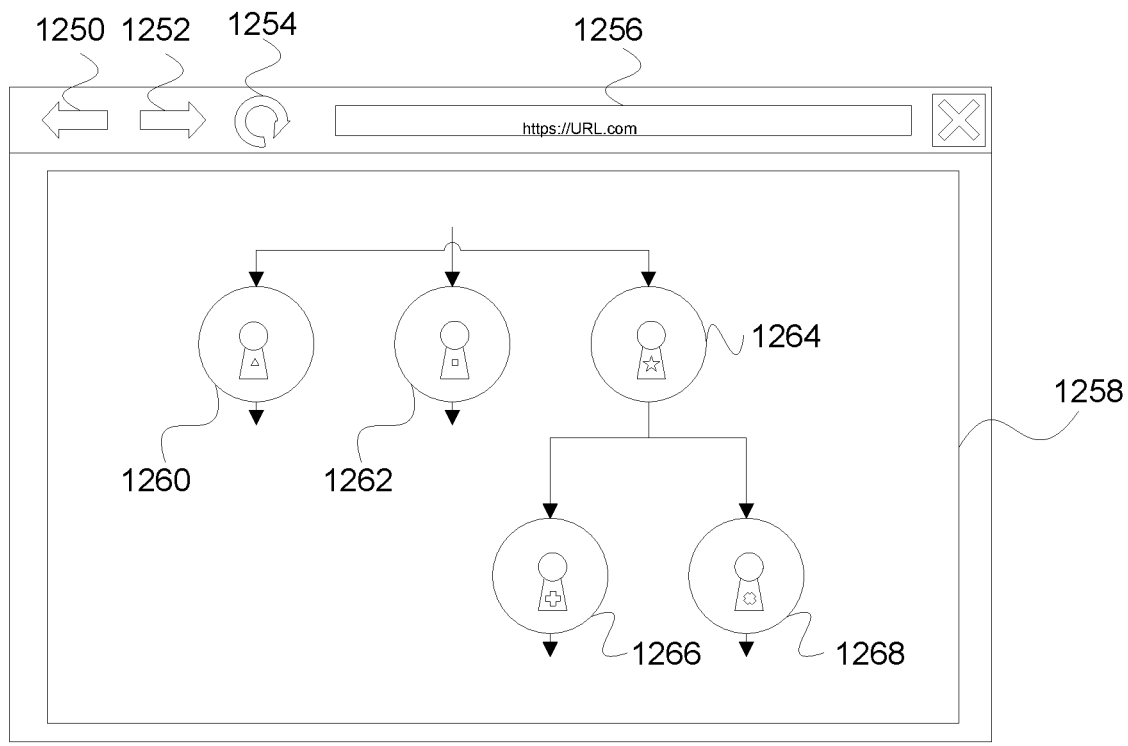
FIG. 12B is a diagram illustrating an embodiment of history management system applied to an organizational chart module.

FIG. 12B is a diagram of an embodiment of the browser display window code applied to a company's organizational chart of employees. In some embodiments, the display of FIG. 12B comprises a display of a company's organizational chart after the user clicks on a node (e.g., node 1216 of FIG. 12A). In the example shown, the user selection of a module causes the display window code to scan a module hierarch, determining the state(s) of the module(s) to consolidate into a composite browser history entry. Back arrow 1250, forward arrow 1252, refresh arrow 1254, and URL box 1256 allow the user to navigate displayed content. The modules on the webpage comprise the following: person node 1260, person node 1262, person node 1264, person node 1266, person node 1268, and organizational chart module 1258. In some embodiments, in the display the only module with state that is designated to be stored as part of the composite state is the organizational chart module 1258. In some embodiments, the composite history entry comprises the URL pointing to the initial organization chart webpage and the state of the organizational chart module which describes that the selected node is node 1264 and the open nodes are nodes 1264 and 1210. The code saves the composite state to the display page state history.

In some embodiments, a user viewing webpage 12B types a new URL into box 1256 to navigate to a new webpage that has no modules that have state. In some embodiments, the display window code requests the display information associated with the new URL from a server system and then loads the webpage associated with the URL. In some embodiments, the user then clicks back button 1250. In some embodiments, the display window code compares the current display window state to the display window state in browser history of the previously stored display page. In some embodiments, the code determines the URLs are different and requests the display information associated with the previous webpage's URL from a server system. In some embodiments, the display window code loads requested webpage and scans a module hierarchy, updating the chart module state to indicate selected node 1264 and open nodes 1264 and 1210. In some embodiments, the user is displayed the webpage of FIG. 12B. In some embodiments, from FIG. 12B, the user clicks forward arrow 1252. In some embodiments, the display window code compares the current display window state to the display window state that was stored subsequently after the current display window state in the browser history. In some embodiments, the display code recognizes the URLs of the two display window states are different, requests the display information associated with the subsequently stored display page's URL from a server system, and loads the requested webpage. In some embodiments, the user is shown the display of the new webpage originally navigated to.

In some embodiments, a user clicks refresh arrow 1254 on webpage 12B, prompting the display window code to reload the most recent state it wrote to the browser history. In some embodiments, the URL of the current webpage is the same as the URL of the most recent state written to browser history. In some embodiments, the server is not requested for display information based on a URL. In some embodiments, then the display window code scans a hierarchy of the module(s) that have state stored in the browser memory, in this case the chart module, and updates its state to match the stored state. In some embodiments, the user is navigated to the window display of FIG. 12B.

Figure 12C:
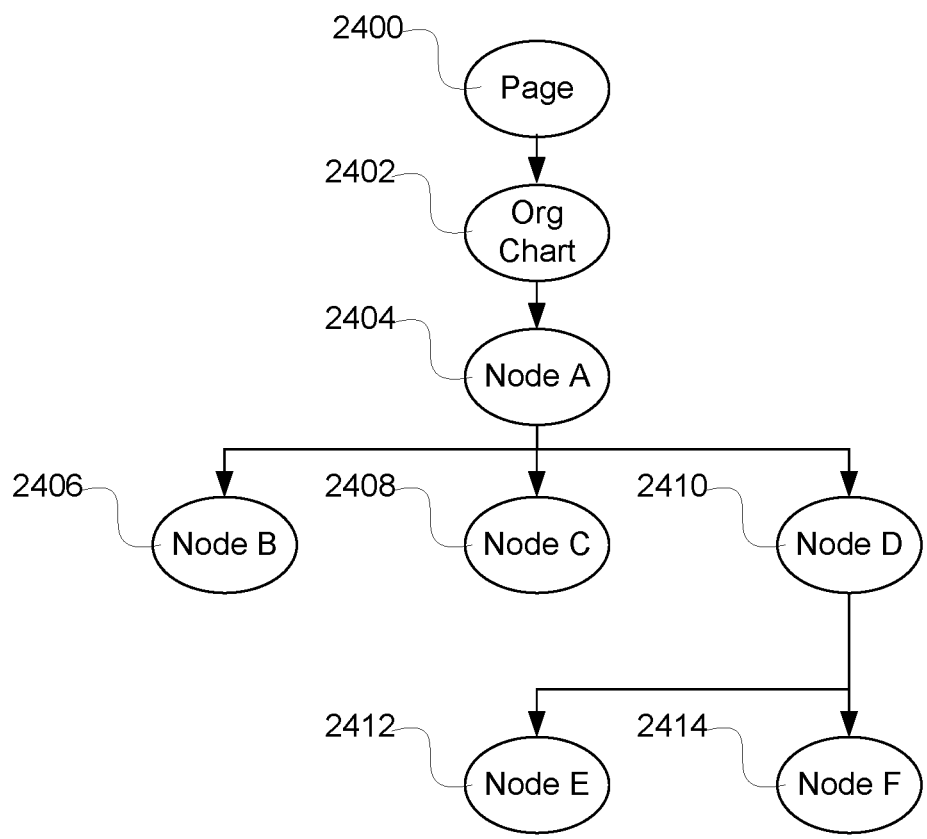
FIG. 12C is a diagram illustrating an embodiment of a tree of widgets.

FIG. 12C is a diagram illustrating an embodiment of a tree of widgets. In some embodiments, the tree of widgets of FIG. 12C is associated with the widgets of FIGS. 12A-B. In the example shown, a tree of widgets comprises page widget 2400 that is associated with org chart widget 2402. Org chart widget 2402 is associated with node A widget 2404. Node A widget 2404 is associated with node B widget 2406, node C widget 2408, and node D widget 2410. Node D widget 2410 is associated with node E widget 2412 and node F widget 2414. The tree of widgets is traverse to check for stateful widgets. The org chart state is found and is the only stateful widget on the page. The state in this case is the only node located in the new state tree. The state here represents the node selected by the user, but still includes the previously open nodes. In this case, node A is still an open node in addition to a selected node (e.g., node D) to show both Node E and Node F. The org chart state is non-bookmarkable so the state is stored in the JSON object for this history item. Both URL and JSON state are stored to the browser history. For example, the inbox state, the URL, and JSON include:

Org Chart state:
SelectedNode: "Node D"
OpenNodes: "Node A, Node D"
URL:
Orgchart.html
JSON State:
{
"SelectedNode": "Node D"
OpenNodes: "Node A, Node D"
}

FIG. 13A is a diagram of an embodiment of the browser history management system applied to a worksheet. In the example shown, back arrow 1300, forward arrow 1302, refresh arrow 1304, and URL box 1306 allow the user to navigate to webpages. In this case, the modules on the webpage comprise worksheet container 1310, tab 1312, tab 1314, tab 1316, tab 1318, and detail container 1308 associated with tab 1312. In some embodiments, a user navigation to webpage FIG. 13A causes the display window code to scan a module hierarchy and determine the worksheet container module to be the only module designated to have state to be stored as part of a composite state. In some embodiments, the state of the worksheet container module includes an indication that tab 1312 is selected and an indication of which section of the spreadsheet is being displayed. In some embodiments, the composite history entry comprises the URL pointing to the initial worksheet webpage and the state of the worksheet container module.

FIG. 13B is a diagram of an embodiment of the browser history management system applied to a worksheet. In some embodiments, the display of FIG. 13B comprises the display after a user clicks a second tab (e.g., tab 1314 of FIG. 13A). In the example shown, back arrow 1330, forward arrow 1332, refresh arrow 1334, and URL box 1336 allow the user to navigate between webpages. In some embodiments, a change to the state of the display causes the state of the display to be committed to the history. In some embodiments, a user navigation to webpage FIG. 13B causes the display window code to scan a module hierarchy. The modules on the webpage comprise the following: worksheet container 1340, tab 1342, tab 1344, tab 1346, tab 1348, and detail container 1338 containing the content associated with tab 1344. In some embodiments, the worksheet container module is determined to be a module that has state that has been designated to be stored as part of the composite state. In some embodiments, the code consolidates the composite browser history entry of the webpage display comprising the URL pointing to the initial display state of the worksheet module and the worksheet module state. In some embodiments, the worksheet module state includes an indication that tab 1344 is selected and an indication of which section of the worksheet is being displayed, in this case columns A-J.

FIG. 13C is a diagram of an embodiment of the browser history management system applied to a worksheet. In some embodiments, the display of FIG. 13C is displayed after the user moves to a different section of the worksheet in FIG. 13B. In the example shown, back arrow 1360, forward arrow 1362, refresh arrow 1364, and URL box 1366 allow the user to navigate between webpages. In some embodiments, when the user clicks to display the next five columns of the worksheet, the user navigation causes the display window code to scan a module hierarchy and determine the state of each module that has state selected to be stored as part of the composite state. The modules on the webpage comprise the following: worksheet container 1370, tab 1372, tab 1374, tab 1376, tab 1378, and content 1368 of display container 1370. In some embodiments, the code consolidates a composite history entry for the display page state history. In some embodiments, the composite history entry comprises the URL pointing to the initial display state of the worksheet module and the worksheet module state stored in browser memory in a non-URL form such as JSON. In some embodiments, the worksheet module state stored in browser memory includes an indication that tab 1374 is selected and an indication of which section of the worksheet is being displayed, in this case columns E-N.

In some embodiments, a user viewing webpage FIG. 13A selects the second tab module, changing the state of the worksheet module, triggering the display code to commit the new display page state, and bringing the user to webpage 13B. In some embodiments the user then selects back arrow 1330 of FIG. 13B. In some embodiments, the display window code compares the current display window state to the display window state in browser history of the previously stored webpage. In some embodiments, the URL of the current webpage is the same as the URL of the previous webpage's state written to browser history. In some embodiments, the server is not requested for display information based on a URL. In some embodiments, the display window code scans a hierarchy of the module(s) that have state stored in the browser memory and updates the worksheet state to indicate tab 1312 is selected and the first five rows of columns A to J are on display. In some embodiments, the user is displayed the display of FIG. 13A. In some embodiments, the user clicks forward arrow 1332. In some embodiments, the display window code compares the current display window state to the display window state that was stored subsequently after the current display window state in the browser history. In some embodiments, the URL of the current webpage is the same as the URL of the subsequent webpage's state written to browser history. In some embodiments, the display window code scans a hierarchy of the module(s) that have state stored in the browser memory and updates the worksheet state. In some embodiments, the user is displayed the display of FIG. 13B.

In some embodiments, a user types a new URL into box 1366 of webpage 13C to navigate to a new webpage. In some embodiments, the display code requests the server system for the display information associated with that URL and then loads the webpage. In some embodiments, the user clicks back button 1360 from the loaded webpage. In some embodiments, the display window code compares the current display window state of the loaded webpage to the display window state that was stored previously in the browser history which describes FIG. 13C. In some embodiments, the display window code determines the URLs are different, and requests the server system for the display information associated with the URL of FIG. 13C. In some embodiments, the display window code loads the webpage associated with the URL of FIG. 13C and scans a module hierarchy, updating the state of the worksheet module. In some embodiments, the user is navigated to the window display of FIG. 13C.

In some embodiments, a user clicks refresh arrow 1364 on webpage 13C, prompting the display window code to reload the most recent state it wrote to the browser history. In some embodiments, the URL of the current webpage is the same as the URL of the most recent state written to browser history. In some embodiments, the server is not requested for display information based on a URL. In some embodiments, then the display window code scans a hierarchy of the module(s) that have state stored in the browser memory, in this case the worksheet module, and updates it to its stored state. In some embodiments, the user is navigated to the window display of FIG. 13C.

In some embodiments, the state of the worksheet module in FIG. 13C is designated to have state but not contribute its state to the composite state (e.g. via a developer decision). In some embodiments, a user types a new URL into box 1366 of FIG. 11C to navigate to a new webpage and then clicks back button 1360. In some embodiments, the user is navigated to webpage 13A by the display window code, with the default first tab 1312 selected. In some embodiments, a user views webpage 13C and then clicks the refresh arrow and is navigated to webpage 13C by the display window code. In some embodiments, the user is navigated to webpage 13A rather than webpage 13C because the state of the worksheet module was suppressed and not written in the browser history.

Figure 13D:
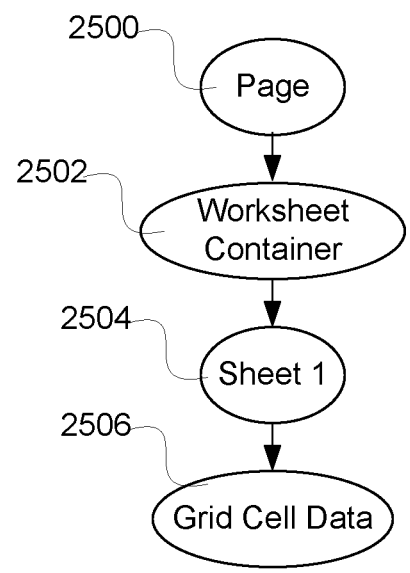
FIG. 13D is a diagram illustrating an embodiment of a tree of widgets.

FIG. 13D is a diagram illustrating an embodiment of a tree of widgets. In some embodiments, the tree of widgets of FIG. 13D is associated with the widgets of FIGS. 13A-C. In the example shown, a tree of widgets comprises page widget 2500 that is associated with worksheet container widget 2502. Worksheet container widget 2502 is associated with sheet 1 widget 2504. Sheet 1 widget 2504 is associated with grid cell data widget 2506. The tree of widgets is traversed to check for stateful widgets. The worksheet container state is found and is the only stateful widget on the page. The state in this case is the only node located in the new state tree, and the first tab is selected. The worksheet is non-bookmarkable, so the state is stored in the JSON object for this history item. Both URL and JSON state are stored to the browser history. For example, the inbox state, the URL, and JSON include:

Worksheet container state:
SelectedTab: "Sheet 1"
URL:
My_awesome_worksheet.html
JSON State:
{
"SelectedTab": "Sheet 1"
}

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for history state management, comprising:
an interface to receive an instruction to begin; and
a processor to:
provide a display window code, wherein the display window code is comprised of a plurality of window modules, wherein a first set of the plurality of window modules are configured to have state that contribute to a composite state of a page, wherein a second set of the plurality of window modules are not designated to have multiple possible states,
wherein the display window code causes retention of a display window state history, wherein the display window state history comprises a display window state for each display window in a set of one or more display windows previously or currently displayed, wherein the display window state comprises a composite display window state for the first set of the plurality of window modules, wherein a first part of the display window state history is stored in a URL and a second part of the display window state history is stored in a non-URL format, wherein the first part of the display window state history is different from the second part of the display window state history, and wherein in response to a user navigating a browser history within a web browser, the first part of the display window state history stored in the URL is aggregated with the second part of the display window state history stored in the non-URL format to restore the composite display window state;

in response to a user selection of one of the plurality of window modules, scan the first set of the plurality of window modules to determine a corresponding state associated with each of the window modules included in the first set of the plurality of window modules;

generate the composite display window state based on the corresponding state associated with each of the scanned window modules included in the first set of the plurality of window modules;

receive a user navigation comprising a selection of a forward button within the web browser; and in response to the forward button selection:
determine that the user navigation includes navigating from a current URL to a subsequent URL; and
request and load a stored state of the subsequent URL, wherein the stored state of the subsequent URL is different from an initial state of the subsequent URL.

2. The system of claim 1, wherein a window module of the first set of the plurality of window modules has one or more possible states.

3. The system of claim 2, wherein a window module of the first set of the plurality of window modules has a default state.

4. The system of claim 2, wherein the composite display window state does not include one or more states of the one or more window modules displayed.

5. The system of claim 1, wherein a first window module in the first set of the plurality of window modules has a second window module nested within it.

6. The system of claim 5, wherein a state of the first window module does not include state information associated with the second window module that is nested within the first window module.

7. The system of claim 5, wherein a state of the second window module does not include state information associated with the first window module that is outside of the second window module.

8. The system of claim 1, wherein the display window code causes consolidating a first state of a first window module and a second state of a second window module into the composite display window state.

9. The system of claim 1, wherein the display window code commits or stores the composite display window state to the display window state history.

10. The system of claim 1, wherein the display window code causes retrieving a stored display window state.

11. The system of claim 10, wherein the display window code causes comparing a current display window state to the stored display window state.

12. The system of claim 1, wherein determining a state of the window module comprises setting the state of the window module according to a stored state.

13. The system of claim 1, wherein the display window code is triggered by the user navigation within the web browser.

14. The system of claim 13, wherein the user navigation is an entering of a URL.

15. The system of claim 13, wherein the user navigation is a selection of a window module.

16. The system of claim 13, wherein the user navigation is a selection of a back arrow of the web browser.

17. The system of claim 13, wherein the user navigation is a selection of a refresh arrow of the web browser.

18. A method for history state management comprising:
receiving an instruction to begin; and
providing, using a processor, a display window code, wherein the display window code is comprised of a plurality of window modules, wherein a first set of the plurality of window modules are configured to have state that contribute to a composite state of a page, wherein a second set of the plurality of window modules are not designated to have multiple possible states, wherein the display window code causes retention of a display window state history,
wherein the display window state history comprises a display window state for each display window in a set of one or more display windows previously or currently displayed,
wherein the display window state comprises a composite display window state for the first set of the plurality of window modules,
wherein a first part of the display window state history is stored in a URL and a second part of the display window state history is stored in a non-URL format, wherein the first part of the display window state history is different from the second part of the display window state history, and
wherein in response to a user navigating a browser history within a web browser, the first part of the display window state history stored in the URL is aggregated with the second part of the display window state history stored in the non-URL format to restore the composite display window state;
in response to a user selection of one of the plurality of window modules, scanning the first set of the plurality of window modules to determine a corresponding state associated with each of the window modules included in the first set of the plurality of window modules;
generating a composite display window state based on the corresponding state associated with each of the scanned window modules included in the first set of the plurality of window modules;
receiving a user navigation comprising a selection of a forward button within the web browser; and
in response to the forward button selection:
determining that the user navigation includes navigating from a current URL to a subsequent URL; and
requesting and loading a stored state of the subsequent URL, wherein the stored state of the subsequent URL is different from an initial state of the subsequent URL.

19. A computer program product for history state management, the computer program product being embodied in a non-transitory computer readable storage medium and comprising computer instructions for:

receiving an instruction to begin; and providing, using a processor, a display window code, wherein the display window code is comprised of a plurality of window modules, wherein a first set of the plurality of window modules are configured to have state that contribute to a composite state of a page, wherein a second set of the plurality of window modules are not designated to have multiple possible states, wherein the display window code causes retention of a display window state history, wherein the display window state history comprises a display window state for each display window in a set of one or more display windows previously or currently displayed, wherein the display window state comprises a composite display window state for the first set of the plurality of window modules, wherein a first part of the display window state history is stored in a URL and a second part of the display window state history is stored in a non-URL format, wherein the first part of the display window state history is different from the second part of the display window state history, and wherein in response to a user navigating a browser history within a web browser, the first part of the display window state history stored in the URL is aggregated with the second part of the display window state history stored in the non-URL format to restore the composite display window state;

in response to a user selection of one of the plurality of window modules, scanning the first set of the plurality of window modules to determine a corresponding state associated with each of the window modules included in the first set of the plurality of window modules;

generating the composite display window state based on the corresponding state associated with each of the scanned window modules included in the first set of the plurality of window modules;

receiving a user navigation comprising a selection of a forward button within the web browser; and in response to the forward button selection:
determining that the user navigation includes navigating from a current URL to a subsequent URL; and
requesting and loading a stored state of the subsequent URL, wherein the stored state of the subsequent URL is different from an initial state of the subsequent URL.

20. The system of claim 1, wherein the non-URL format is stored as a javascript object notation (JSON) object.

21. The system of claim 1, wherein in response to the user clicking a bookmark within the web browser, the first part of the display window state history stored in the URL is used to restore the composite display window state without aggregating the first part of the display window state history stored in the URL and the second part of the display window state history stored in the non-URL format.

22. The system of claim 1, wherein the composite display window state is caused to be created in response to a serialization event, wherein creating the composite display window state comprises:

traversing a module hierarchy of the first set of the plurality of window modules; and in response to determining that a window module of the module hierarchy is designated to contribute state to the composite display window state, determining a state of the window module, and storing the state of the window module as part of the composite display window state.

23. The system of claim 22, wherein the serialization event comprises a user navigation within the web browser.

* * * * *